US008253952B2

(12) United States Patent
Tsuchitoi

(10) Patent No.: US 8,253,952 B2
(45) Date of Patent: Aug. 28, 2012

(54) IMAGE FORMING APPARATUS AND CONTROL METHOD THEREFOR, PROGRAM FOR IMPLEMENTING THE METHOD, AND PRINTING SYSTEM

(75) Inventor: Naoki Tsuchitoi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1205 days.

(21) Appl. No.: 11/360,754

(22) Filed: Feb. 23, 2006

(65) Prior Publication Data

US 2006/0187486 A1    Aug. 24, 2006

(30) Foreign Application Priority Data

Feb. 23, 2005  (JP) ................................. 2005-047507
Feb. 15, 2006  (JP) ................................. 2006-038462

(51) Int. Cl.
*G06K 15/00* (2006.01)
*G06K 1/00* (2006.01)

(52) U.S. Cl. ..................... 358/1.14; 358/1.13; 358/1.15; 358/1.16; 358/1.9

(58) Field of Classification Search .................. None
See application file for complete search history.

(56) References Cited

U.S. PATENT DOCUMENTS

| | | | |
|---|---|---|---|
| 6,633,395 B1 * | 10/2003 | Tuchitoi et al. | 358/1.14 |
| 6,707,574 B1 * | 3/2004 | Freeman et al. | 358/1.9 |
| 7,020,781 B1 * | 3/2006 | Saw et al. | 705/51 |
| 7,050,186 B1 * | 5/2006 | Noda | 358/1.15 |
| 7,382,487 B2 * | 6/2008 | Ikegami | 358/1.6 |
| 7,471,406 B2 | 12/2008 | Tsuchitoi | |
| 2002/0089693 A1 * | 7/2002 | Maruyama | 358/1.15 |
| 2002/0126304 A1 * | 9/2002 | Jakobsson et al. | 358/1.12 |
| 2003/0184807 A1 | 10/2003 | Tsuchitoi | |
| 2004/0062562 A1 * | 4/2004 | Nakatani et al. | 399/82 |

FOREIGN PATENT DOCUMENTS

| | | | |
|---|---|---|---|
| JP | 09-028852 A | | 2/1997 |
| JP | 9-048165 A | | 2/1997 |
| JP | 09-048165 A | | 2/1997 |
| JP | 10161823 A | * | 6/1998 |
| JP | 2003-022377 A | | 1/2003 |
| JP | 2003-150336 A | | 5/2003 |
| JP | 2003150336 A | * | 5/2003 |
| JP | 2003-216579 A | | 7/2003 |
| JP | 2003216579 A | * | 7/2003 |
| JP | 2003-288197 A | | 10/2003 |
| JP | 2004-1408 A | | 1/2004 |
| JP | 2004-070708 A | | 3/2004 |
| JP | 2005-031784 A | | 2/2005 |

* cited by examiner

*Primary Examiner* — Marivelisse Santiago Cordero
*Assistant Examiner* — Huo Long Chen
(74) *Attorney, Agent, or Firm* — Rossi, Kimms & McDowell LLP

(57) ABSTRACT

An image forming apparatus which can suppress disordered printing-out by a user and contribute to a reduction in TCO. A print job received through a network 104 is printed out by printing apparatus 103 that includes a host computer 101 and an authentication server 102. The authentication server 102 acquires limiting information which limits output of the print job. The host computer 101 limits printing setting for the print job in accordance with the limiting information acquired by the authentication server 102.

8 Claims, 17 Drawing Sheets

FIG. 19

| | USER NAME 1601 | PASSWORD 1602 | MAXIMUM NUMBER OF PRINTABLE SHEETS 1603 | NUMBER OF ACTUALLY PRINTED SHEETS 1604 |
|---|---|---|---|---|
| 1611 → | User1 | Akd5sj4f | 500 | 123 |
| 1612 → | User2 | saFif98w | 1000 | 515 |
| 1613 → | User3 | vGks9jgla | 2000 | 1021 |
| 1614 → | Guest | NONE | 0 | 0 |

1600

IMAGE FORMING APPARATUS AND CONTROL METHOD THEREFOR, PROGRAM FOR IMPLEMENTING THE METHOD, AND PRINTING SYSTEM

BACKGROUND OF THE INVENTION

1. Field of the Invention

The present invention relates to an image forming apparatus and a control method therefor, a program for implementing the method, and a printing system and, more particularly, to an image forming apparatus and a control method therefor, a program for implementing the method, and a printing system which receive print data created by a host computer through an infrastructure such as a network and perform printing on printing paper.

2. Description of the Related Art

In a printing system in which a printing apparatus receives print data created by a host computer through a network and performs printing, a reduction in TCO (Total Cost of Ownership) including not only the cost for introducing a printing apparatus and system but also the cost of expendable supplies such as printing paper and a colorant typified by toner attracts great attention in recent years in terms of a reduction in office costs or the conservation of the global environment.

Conventional problems in such a printing system include one of that anyone who can access a network can perform printing using a printing apparatus installed in an office. Since printing limitations are imposed on no one, and no trace of printing is left, a user may fail to exercise self-control. Accordingly, an excessive amount of printing is often performed, thus causing an increase in office costs.

Under the circumstances, there is implemented a printing system which performs printing limitation for address information such as an IP address in TCP/IP and manages the number of printed sheets by acquiring a print log.

However, the printing limitation for address information adopts a rough method, i.e., includes imposing printing limitations on an apparatus with a particular IP address, and the printing system is unable to perform detailed management such as limiting of the number of sheets to be printed for a particular user. In management of the number of printed sheets with a print log, it is possible to leave a print log for printout, but an administrator needs to monitor the print log to check whether unauthorized printing has been performed. This increases labor costs and causes a departure from the intention to reduce the TCO. In order to solve this problem, there is proposed a printing system having a user-limiting function which limits printout on a user-by-user basis (see Japanese Laid-Open Patent Publication (Kokai) No. 2003-150336).

As in Japanese Laid-Open Patent Publication (Kokai) No. 2003-216579, there has been a client which adds a digital signature to a print request to detect falsification of the print request and transmits it to a print server. The print server confirms the presence of the digital signature and transmits it to a printing processing unit. The printing server verifies the validity of the digital signature and controls whether to enable printing.

As in Japanese Laid-Open Patent Publication (Kokai) No. 2003-022377, there has been a technique in which a printer receives a license ticket including usage rules indicating the printable number of sheets and analyzes the license ticket. The printer prints the contents with a content ID in accordance with the usage rules.

The above described techniques have the following problems.

1. In a general office, there is often found a manner of operation in which the administrative privileges for a host computer are made available to allow free installation of a printer driver for the purpose of increasing the convenience of users of the host computer and reducing the management costs. However, since user authentication is not performed for print data to be transmitted to a printing apparatus by an authentication server, and no limitations in the printable number of sheets are imposed on the print data with limiting information, printing is performed in accordance with a print request from a user. For this reason, the above-mentioned manner of operation does not contribute to a reduction in the TCO of the office. If a print job reflects limiting information acquired from the authentication server, it is possible to impose printing limitations on the basis of the policy of a system defined in the authentication server. However, this cannot be implemented unless the host computer performs authentication for the authentication server and imposes printing limitations according to predetermined limiting information.

2. It is impossible to determine immediately at the time of execution of a print job whether all pages of the print job can be printed. It is also impossible to impose detailed limitations including printing setting limitations. The determination can be made by determining, from information of the currently remaining printable number of sheets (calculated from the maximum printable number of sheets and the actually printed number of sheets) and the total number of print pages of a print job, whether the number of sheets for the print job falls at or below the limited printable number of sheets. However, it may be impossible to immediately know, at the time of execution of the print job, the total number of print pages of a print job, depending on the specifications for print job creation by an OS (operating system) used by a host computer. To cope with this, there can be considered a method of actually creating all pages set for a print job, confirming the total number of print pages, and then transmitting the print job to a printing apparatus. The start of transmission of a print job, however, is delayed by time corresponding to the number of print pages and data size, and the total throughput decreases. Accordingly, the method is not practical.

3. It is impossible to impose limitations on job settings on the side of a printing apparatus. More specifically, it is impossible to control which setting is enabled for which user.

SUMMARY OF THE INVENTION

It is an object of the present invention to provide an image forming apparatus and a control method therefor, a program implementing the method, and a printing system which can suppress disordered printing-out by a user and contribute to a reduction in TCO.

To attain the above object, in a first aspect of the present invention, there is provided an image forming apparatus which prints out a print job received through a network, comprising an acquisition device that acquires limiting information which limits output of the print job, and a limitation device that limits printing setting for the print job in accordance with the limiting information acquired by the acquisition device.

Preferably, the image forming apparatus comprises a determination device that determines whether the limiting information is attached to the print job and a print job cancellation device that cancels the print job if the determination device determines that the limiting information is not attached to the print job.

Preferably, the limitation device limits a number of sheets to be printed out for the print job to be not more than an upper limit of the number of sheets to be printed out if the upper limit is included in the limiting information.

Also preferably, the limitation device performs control such that the output of the print job results in double-sided printing if the double-sided printing is designated as the limiting information.

Alternatively, the limitation device performs control such that the output of the print job results in N-in-1 printing if the N-in-1 printing is designated as the limiting information.

Preferably, the limitation device performs control such that the output of the print job results in monochrome printing if the monochrome printing is designated as the limiting information.

More preferably, the image forming apparatus comprises a print job cancellation setting device that sets cancellation of a print job by the print job cancellation device and a cancellation setting determination device that determines whether cancellation of a print job is set by the print job cancellation setting device, wherein a job packet of a print job is abandoned if the cancellation of the print job is set.

More preferably, the determination device determines from an operation code indicating the limiting information and stored in at least one job packet which constitutes the print job whether there is the limiting information.

Preferably, for a print job to which the limiting information is attached, the limiting information and digital signature information generated by a predetermined authentication technology are stored in a data area in at least one job packet which constitutes the print job.

More preferably, the image forming apparatus comprises a limiting information determination device that acquires a job packet from a print job to which the limiting information is attached and determines whether the job packet stores the limiting information and a digital signature verification device that performs digital signature verification for a job packet which stores the limiting information, using authentication information acquired in advance.

Preferably, the image forming apparatus comprises a number-of-sheets specifying device that specifies a number of sheets to be printed out for the print job, wherein the limitation device decides whether to enable printing of the print job using the number of sheets specified by the number-of-sheets specifying device and the limiting information acquired by the acquisition device.

Preferably, the print job includes a page description language, the number-of-sheets specifying device specifies the number of sheets to be printed by processing the page description language, and the limitation device limits processing for obtaining the output of the print job in response to detection of the number of sheets to be printed indicated by the limiting information being exceeded by the specified number of sheets to be printed.

Preferably, the limiting information is directive information which performs one of enabling and disabling at least one of color printing setting, monochrome printing setting, and N-up printing setting.

To attain the above object, in a second aspect of the present invention, there is provided an information processing apparatus comprising a transmission device that transmits authentication information and an acquisition device that acquires limiting information for limiting setting for a print job transmitted in response to the authentication information being transmitted by the transmission device, wherein the transmission device transmits the print job to a printing apparatus together with the limiting information acquired by the acquisition device.

Preferably, the limiting information is directive information which performs one of enabling and disabling at least one of color printing setting, monochrome printing setting, and N-up printing setting.

To attain the above object, in a third aspect of the present invention, there is provided a control method for an image forming apparatus which prints out a print job received through a network, comprising an acquisition step of acquiring limiting information which limits output of the print job, and a limitation step of limiting printing setting for the print job in accordance with the limiting information acquired in the acquisition step.

Preferably, the control method for an image forming apparatus comprises a determination step of determining whether limiting information is attached to the print job and a print job cancellation step of canceling the print job if it is determined in the determination step that the limiting information is not attached to the print job.

Preferably, in the limitation step, the number of sheets to be printed out for the print job is limited not more than an upper limit. of the number of sheets to be printed out if the upper limit is included in the limiting information.

Also preferably, in the limitation step, control is performed such that the output of the print job results in a double-sided printing if the double-sided printing is designated as the limiting information.

Alternatively, in the limitation step, control is performed such that the result the output of the print job results in an N-in-1 printing if the N-in-1 printing is designated as the limiting information.

Preferably, in the limitation step, control is performed such that the output of the print job results in a monochrome printing if the monochrome printing is designated as the limiting information.

More preferably, the control method for an image forming apparatus comprises a print job cancellation setting step of setting cancellation of a print job in the print job cancellation step and a cancellation setting determination step of determining whether cancellation of a print job is set in the print job cancellation setting step, wherein a job packet of a print job is abandoned if cancellation of the print job is set.

More preferably, in the determination step, whether there is the limiting information is determined from an operation code indicating the limiting information and stored in at least one job packet which constitutes the print job.

Preferably, for a print job to which the limiting information is attached, the limiting information and digital signature information generated by a predetermined authentication technology are stored in a data area in at least one job packet which constitutes the print job.

More preferably, the control method for an image forming apparatus comprises a limiting information determination step of acquiring a job packet from a print job to which the limiting information is attached and determining whether the job packet stores the limiting information and a digital signature verification step of performing digital signature verification for a job packet which stores the limiting information, using authentication information acquired in advance.

Preferably, the control method for an image forming apparatus comprises a number-of-sheets specifying step of specifying a number of sheets to be printed out for the print job, wherein in the limitation step, whether to enable printing of the print job is decided using the number of sheets specified in the number-of-sheets specifying step and the limiting information acquired in the acquisition step.

Preferably, the print job includes a page description language, the number of sheets to be printed is specified in the number-of-sheets specifying step by processing the page description language, and in the limitation step, the image forming apparatus is controlled to limit processing for obtaining the output of the print job in response to detection of the number of sheets to be printed indicated by the limiting information being exceeded by the specified number of sheets to be printed.

Preferably, the limiting information is directive information which performs one of enabling and disabling at least one of color printing setting, monochrome printing setting, and N-up printing setting.

To attain the above object, in a fourth aspect of the present invention, there is provided an information processing method comprising a transmission step of transmitting authentication information, and an acquisition step of acquiring limiting information for limiting setting for a print job transmitted in response to the authentication information being transmitted in the transmission step, wherein in the transmission step, the print job is transmitted to a printing apparatus together with the limiting information acquired in the acquisition step.

Preferably, the limiting information is directive information which performs one of enabling and disabling at least one of color printing setting, monochrome printing setting, and N-up printing setting.

To attain the above object, in a fifth aspect of the present invention, there is provided a computer-readable program for causing a computer to perform a control method according to the third aspect of the present invention.

To attain the above object, in a sixth aspect of the present invention, there is provided a computer-readable program for causing a computer to perform an information processing method according to the fourth aspect of the present invention.

To attain the above object, in a seventh aspect of the present invention, there is provided a computer-readable storage medium storing a program according to the fifth aspect of the present invention.

To attain the above object, in an eighth aspect of the present invention, there is provided a computer-readable storage medium storing a program according to the sixth aspect of the present invention.

To attain the above object, in a ninth aspect of the present invention, there is provided a printing system having a first information processing apparatus for creating a print job, an image forming apparatus for performing printing based on the print job, and a second information processing apparatus for performing authentication for the print job that are connected to one another through a network, comprising an authentication request device in the first information processing apparatus that issues an authentication request to the second information processing apparatus at a time of creation of the print job, a limiting information acquisition device in the first information processing apparatus that acquires limiting information corresponding to the print job from the second information processing apparatus, a print job transmission device in the first information processing apparatus that attaches the acquired limiting information to the print job as a job ticket and transmits the print job to the image forming apparatus, a limiting information determination device in the image forming apparatus that analyzes the received print job and determines whether the job ticket is attached, and a printing device in the image forming apparatus that imposes, with the limiting information described in the job ticket, a predetermined limitation on printing-out of the print job when the job ticket is attached to the print job.

Preferably, the printing system comprises a printing job cancellation device that cancels the print job when the job ticket is not attached to the print job.

With the present invention, a received print job is analyzed, and it is determined whether limiting information for imposing predetermined limitations on printing-out of the print job is attached. If it is determined that limiting information is attached to the print job, the limiting information is analyzed, and the predetermined limitations are imposed on the printing-out of the print job using the analyzed limiting information. Accordingly, it is possible to impose, with limiting information, limitations on printing-out of a print job without changing the configuration of a printer driver from a conventional one to another and to suppress disordered printing-out by a user and contribute to a reduction in TCO.

The above and other objects, features, and advantages of the invention will become more apparent from the following detailed description taken in conjunction with the accompanying drawings.

BRIEF DESCRIPTION OF THE DRAWINGS

FIG. 19 is a schematic diagram of a database of authentication information and limiting information on a user-by-user basis held in an authentication server in FIG. 18.

DETAILED DESCRIPTION OF THE PREFERRED EMBODIMENTS

A basic printing system on which the present invention is based will be shown with reference to FIGS. 18 to 20, and after that, the present invention will be explained.

Figure 18:
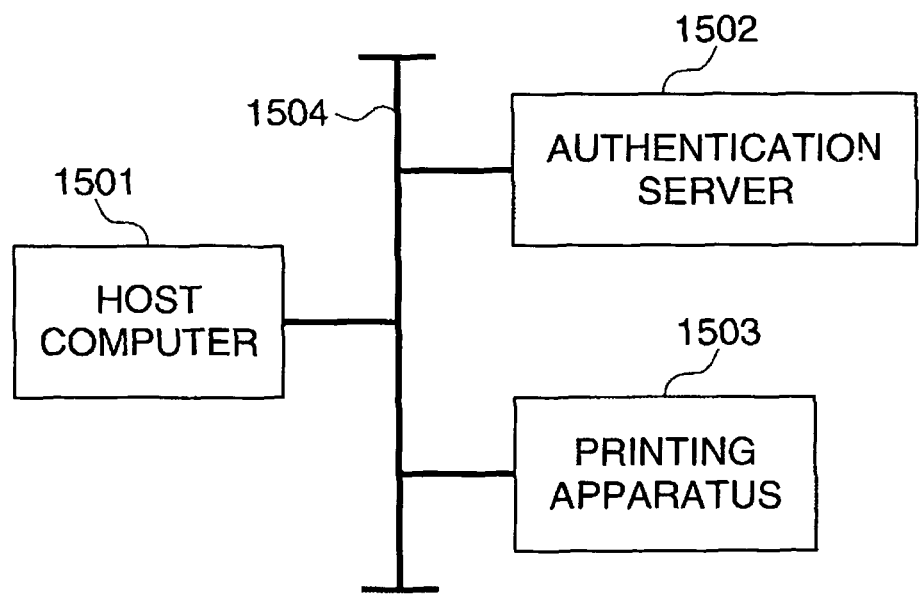
FIG. 18 is a block diagram showing the overall configuration of a printing system having a user-limiting function.

FIG. 18 is a block diagram showing the overall configuration of the basic printing system having a user-limiting function.

As shown in FIG. 18, the basic printing system comprises a host computer 1501 which creates image data upon use of a user and transmits a print job based on the image data to a printing apparatus 1503 to cause the printing apparatus 1503 to perform printing, an authentication server 1502 which holds user authentication information and limiting information for a printout, and the printing apparatus 1503 which receives a print job from the host computer 1501 through a network 1504 and performs printing on a printing sheet using a known printing technology such as electrophotography or ink-jet technology. The host computer 1501, authentication server 1502, and printing apparatus 1503 are connected to one another through the network 1504 using a known technology such as Ethernet (registered trademark).

FIG. 19 is a schematic diagram of a database of authentication information and limiting information on a user-by-user basis held in the authentication server in FIG. 18.

As shown in FIG. 19, a user name and password as authentication information and the maximum printable number of sheets and the actually printed number of sheets as limiting information are stored in a database 1600 on a user-by-user basis. A user name is stored in a column 1601 of user name while a password is stored in a column 1602 of password. The maximum printable number of sheets up to which a user in question is allowed to perform printing for a month in question is stored in a column 1603 of maximum printable number of sheets while the number of sheets actually used for printout by the user in the month is stored in a column 1604 of actually printed number of sheets.

A password in plain text (or clear text) before encryption is stored in the column 1602 of password for the sake of convenience. Actually, one-way hash values in plain text are stored in terms of security to prevent leakage of passwords, and authentication is performed by comparing the hash value of an input password with the hash values. The details of the authentication will be omitted. Needless to say, only those who have administrative privileges can read and write from/to the database 1600 for security reasons.

In the database 1600, a row 1611 includes entries for a user whose name is "User1." A character string "Akd5sj4f" is registered as the password. The maximum printable number of sheets set to "500" shows that the number of sheets available for printing to the user "User1" for a month in question is limited to 500. The number of sheets actually used for printing up to the current time in the month is registered as the actually printed number of sheets. The actually printed number of sheets is updated upon printing processing being performed by the printing apparatus 103. The actually printed number of sheets shows that the user "User1" has already used "123" sheets for printing.

Similarly, the limiting information and the like of users "User2" and "User3" are stored in rows 1612 and 1613, respectively. A row 1614 includes entries for a "Guest" user. A password is not registered for the "Guest" user. The maximum printable number of sheets set to "0" shows that the "Guest" user is not allowed to perform printing. Note that whether to provide a row for a "Guest" user in the database 1600 depends on the policy of the system and that the database 1600 may or may not have the row 1614 for the "Guest" user.

A user inputs a user name and password upon logging on to the host computer 1501. These pieces of information are transmitted from the host computer 1501 to the authentication server 1502 through the network 1504, and the authentication server 1502 performs user authentication by checking the pieces of information with user names and corresponding passwords registered in the database 1600. If the user authentication is successful, the authentication server 1502 notifies the host computer 1501 of the maximum printable number of sheets and the actually printed number of sheets. For example, if the user "User1" succeeds in authentication, the maximum printable number of sheets (=500) and the actually printed number of sheets (=123) are sent as return values to the host computer 1501.

When printing in the printing apparatus 1503, the host computer 1501 takes into consideration the maximum printable number of sheets (=500) and the actually printed number of sheets (=123) sent from the authentication server 1502. The host computer 1501 recognizes that up to 377 (=500−123) sheets are available for printing and allows use of up to 377 sheets for printing. Assume that the number of sheets expected to be printed set for a print job is, e.g., 400. In this case, upon execution of the print job, the number of sheets expected to be printed exceeds a printing upper limit of 377, and thus, the host computer 1501 sends a warning to the user.

Figure 20:
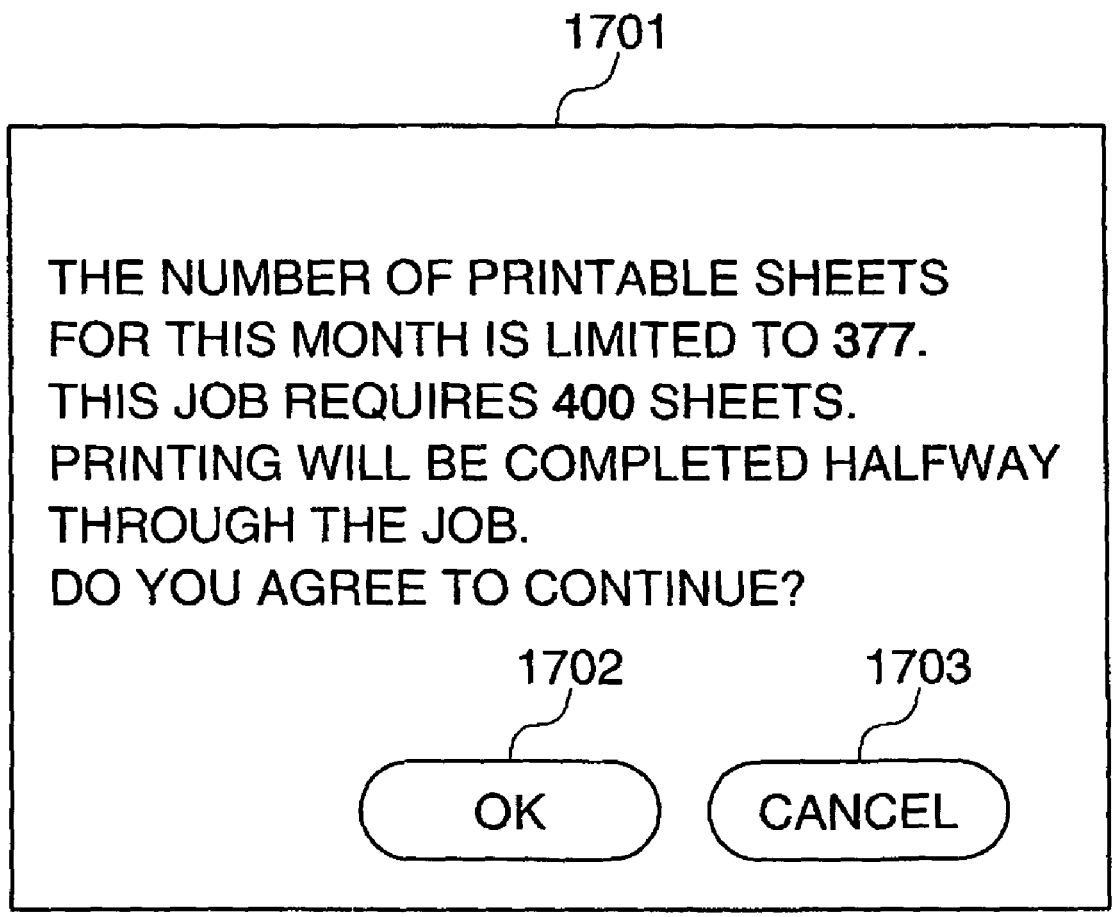
FIG. 20 is a view showing an example of a dialog box displayed when a host computer executes a print job.

FIG. 20 is a view showing an example of a dialog box displayed when the host computer 1501 executes a print job.

As shown in FIG. 20, a dialog box 1701 is displayed by a printer driver (not shown) when the host computer 1501 tries to execute a print job, and if the number of sheets expected to be printed set for the print job (=400) exceeds the printing upper limit, as described above. An OK button 1702 for performing printing and a cancel button 1703 for cancellation are arranged in the dialog 1701.

When the cancel button 1703 is pressed, a print request itself is cancelled. When the OK button 1702 is pressed, the host computer 1501 limits the number of sheets to be printed set for the print job to 377 and performs printing. Since data corresponding to the last 23 sheets are not printed out, a user may not be able to obtain a desired printing result.

In the above, the basic printing system on which the present invention is based has been described.

In the following, preferred embodiments of the present invention will be described with reference to the appended drawings.

Figure 1:
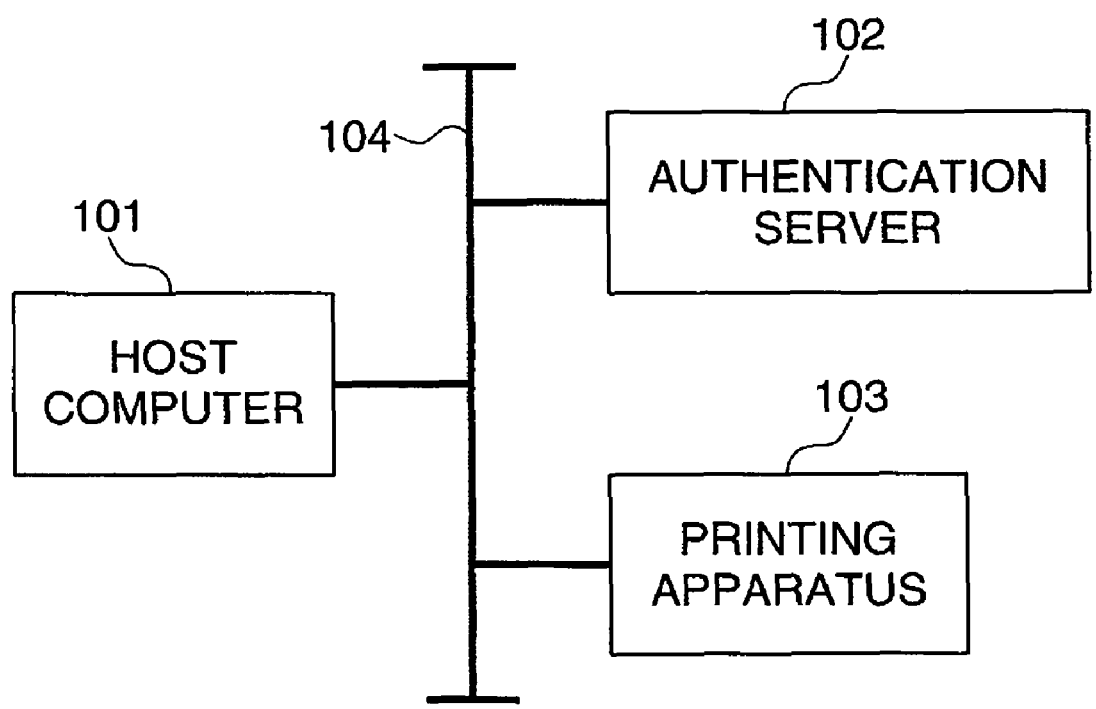
FIG. 1 is a block diagram showing the overall configuration of a printing system comprising a printing apparatus as an image forming apparatus according to a first embodiment of the present invention.

FIG. 1 is a block diagram showing the overall configuration of a printing system comprising a printing apparatus as an image forming apparatus according to a first embodiment of the present invention.

As shown in FIG. 1, the printing system comprises a host computer 101 which, upon being used by a user, creates image data and transmits a print job based on the image data to a printing apparatus 103 (image forming apparatus) to cause the printing apparatus 103 to perform printing, an authentication server 102 which holds user authentication information (e.g., a job issuer name such as a user name or PC name or a password) and limiting information for a printout, and the printing apparatus 103 which receives a print job from the host computer 101 through the network 104 and performs printing on a printing sheet using a known printing technology such as electrophotography or ink-jet technology. The host computer 101, authentication server 102, and printing apparatus 103 are connected to one another through the network 104 using a known technology such as Ethernet (registered trademark).

Figure 2:
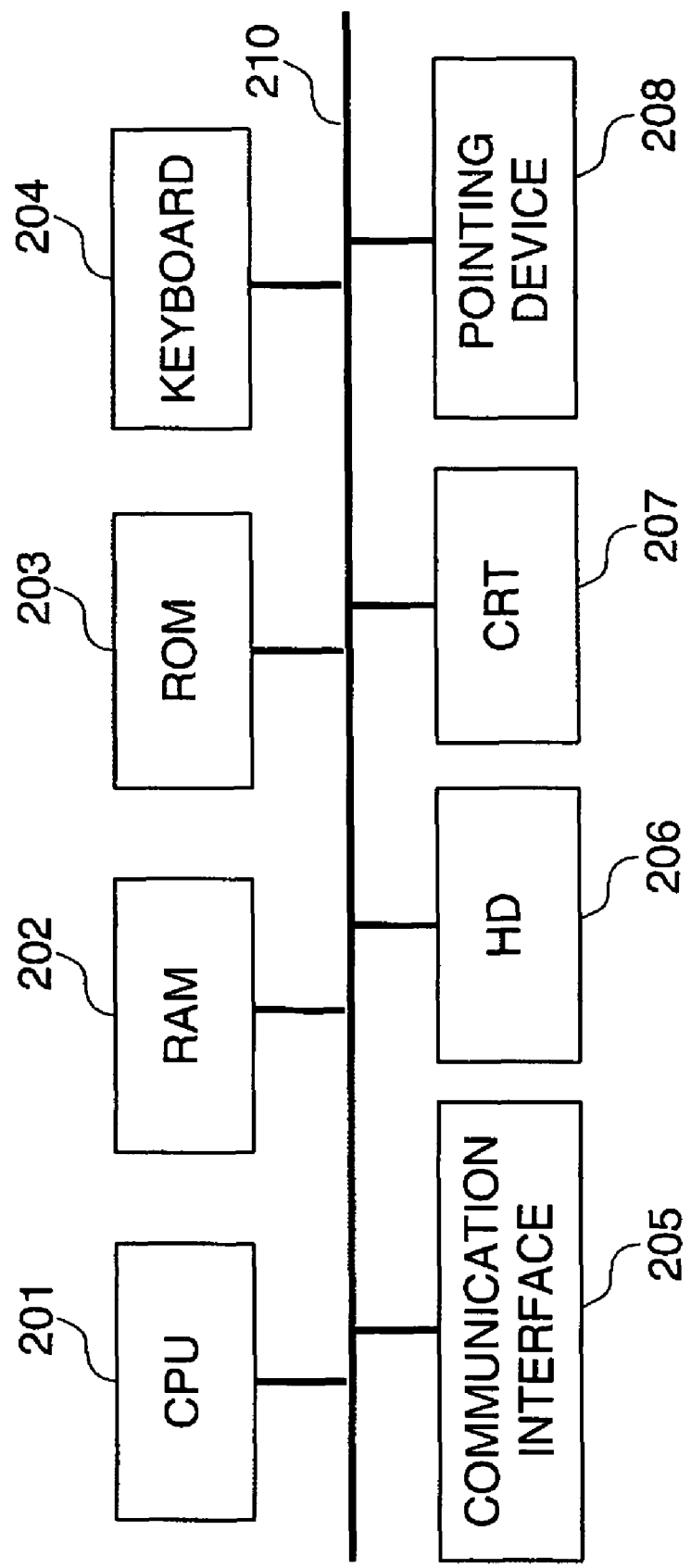
FIG. 2 is a block diagram showing the hardware configuration of a host computer in FIG. 1.

FIG. 2 is a block diagram showing the hardware configuration of the host computer 101 in FIG. 1.

As shown in FIG. 2, a CPU 201, a RAM 202, a ROM 203, a keyboard 204, a communication interface 205, a hard disk (HD) 206, a CRT 207 as a display device, and a pointing device 208 such as a mouse are connected through a system bus 210 such that they can communicate with one another.

A control program is stored in advance in the ROM 203 or HD 206. The CPU 201 functions as a computer by loading the control program from the ROM 203 or HD 206 into the RAM 202 and executing it, as needed.

Also, the CPU 201 displays various types of information through the CRT 207 and accepts a user's instruction or the like from the keyboard 204 or pointing device 208. Additionally, the CPU 201 communicates with another device on the network 104 through the communication interface 205.

An instruction from a user to the printing apparatus 103 or presentation of information to a user may be given through, e.g., a user interface 314 in FIG. 3 (to be described later) or through the host computer 101 connected through the network 104. The authentication server 102 has the configuration shown in FIG. 2, similarly to the host computer 101.

Figure 3:
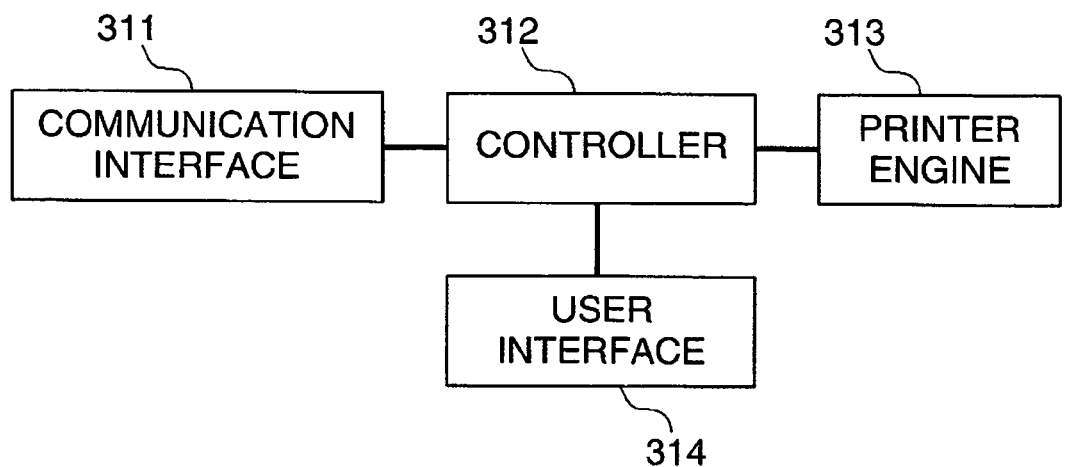
FIG. 3 is a diagram showing the hardware configuration of a printing apparatus in FIG. 1.

FIG. 3 is a diagram showing the hardware configuration of the printing apparatus 103 in FIG. 1.

As shown in FIG. 3, the printing apparatus 103 comprises a controller 312, communication interface 311, printer engine 313, and user interface 314.

The controller 312 controls the overall operation of the printing apparatus 103. The communication interface 311 is an interface designed for the printing apparatus 103 (more specifically, the controller 312) to communicate with another device on the network 104. Ethernet (registered trademark) or the like can be used as the communication interface 311.

Under the control of the controller 312, the printer engine 313 causes e.g., a laser-beam printer, an ink-jet printer, or any other printer to perform a print operation.

The user interface 314 is composed of, e.g., an LCD (Liquid Crystal Display), touch key, and the like. The user interface 314 displays information supplied from the controller 312 and transmits an operation instruction or the like input from a user to the controller 312.

Figure 4:
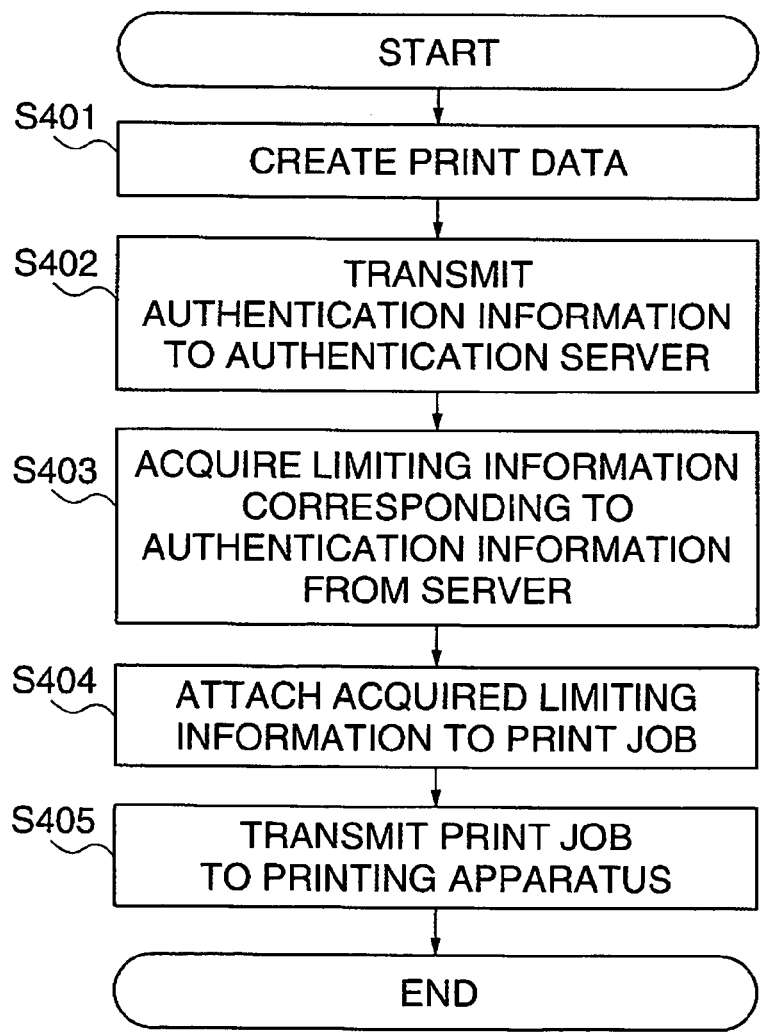
FIG. 4 is a flowchart showing the process of transmitting a print job in the host computer.

FIG. 4 is a flowchart showing the process of transmitting a print job in the host computer 101.

As shown in FIG. 4, when a user creates a document file with word-processing application software or the like installed in the host computer 101 and gives a printing instruction, the host computer 101 creates print data with a printer driver (step S401).

The host computer 101 transmits the authentication information of the user to the authentication server 102, which is reliable as a system, and performs authentication (step S402). Examples of authentication information include the credentials of a user who has issued a print job (a signature as a secret key specific to the user or the like). As the authentication information, information specific to the host computer 101 serving as a transmission source (e.g., a MAC address or an IP address) may be used, but one resistant to personation is preferable. In the authentication server 102, settings such as whether to enable full-color printing and which N-up option is selected (how many pages are to be laid out on one sheet) are stored for each user in tabular form. If the authentication is successful in the authentication server 102, limiting information corresponding to the authentication information is issued as a job ticket (ACT: Access Control Token) from the authentication server 102, and the host computer 101 acquires the issued limiting information (step S403). More specifically, upon receipt of the credentials of a particular user transmitted, the authentication server 102 acquires limiting information corresponding to the particular user from the database. The authentication server 102 transmits the acquired limiting information to the host computer 101. For example, the upper limit of the printable number of sheets (the upper limit of the number of times for which printing can be made), monochrome printing, double-sided printing, N-in-1 printing, and the like for imposing limitations on the result of outputting the print job issued by the authorized user are designated in the limiting information. It is possible to set limiting information for each user. More specifically, limiting information is directive information which enables or disables, for a job, at least one of color printing setting, monochrome printing setting, and N-up printing setting.

The acquired limiting information is attached to the print job (step S404), and the print job is transmitted to the printing apparatus 103 (step S405).

The printing apparatus 103 determines whether the attribute information of the print job created by the printer driver coincides with that described in the limiting information, as will be described later. If the pieces of attribute information do not coincide with each other, priority is given to the attribute information described in the limiting information, and the attribute information of the print job created by the printer driver is overwritten with that described in the limiting information. Note that the overwritten attribute information is disallowed to be changed from the outside.

Description of limiting information in an ACT makes it possible to impose limitations on the result of outputting a print job even if the print job is issued in any form. The description also makes it possible to impose limitations on printing-out without changing the configuration of the printer driver from a conventional one to another.

Figure 5:
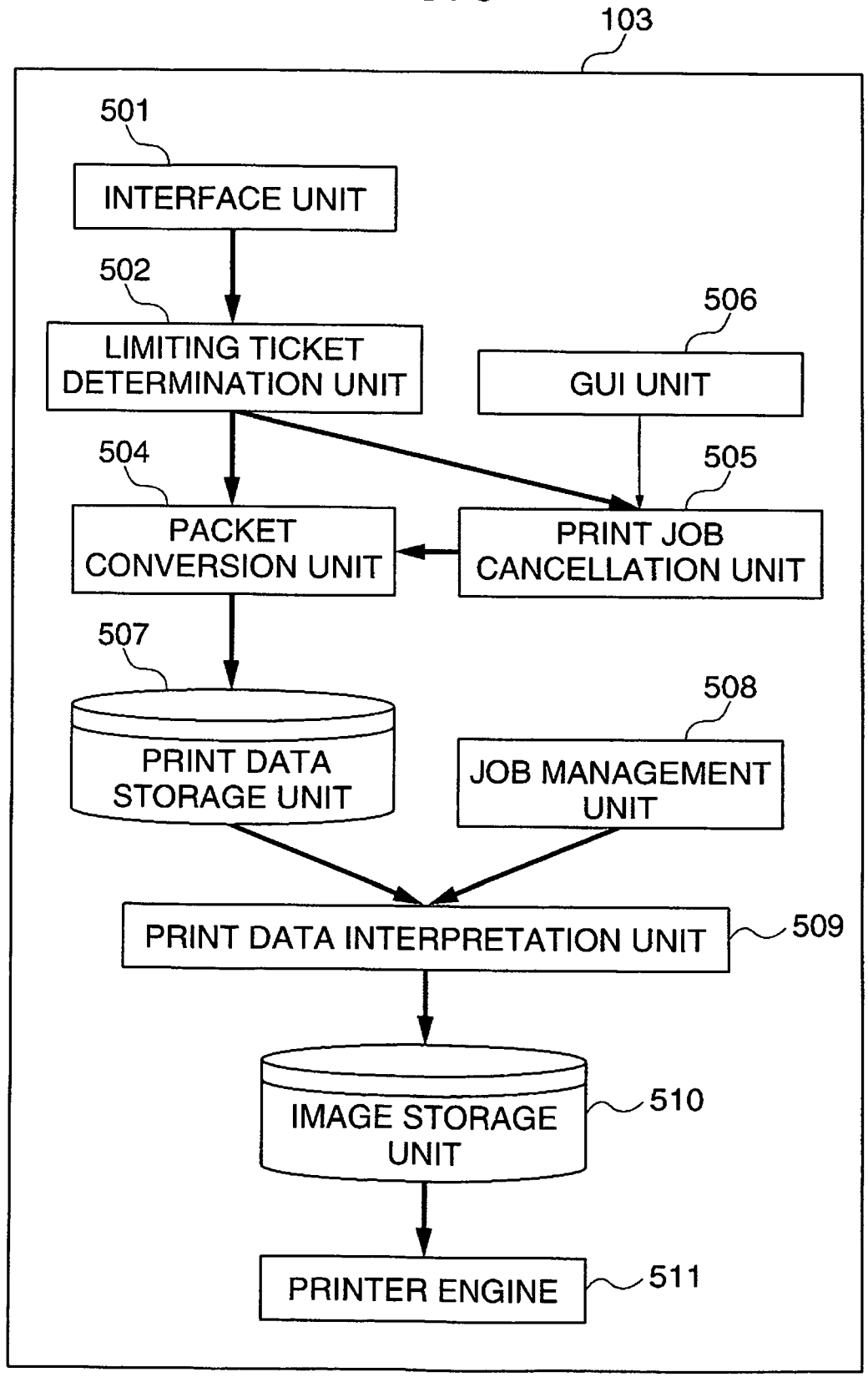
FIG. 5 is a block diagram showing the software configuration related to the printing processing of the printing apparatus.

FIG. 5 is a block diagram showing the software configuration related to the printing processing of the printing apparatus 103.

As shown in FIG. 5, the printing apparatus 103 comprises an interface unit 501 which connects to the network 104 to receive a print job from the host computer 101, a limiting ticket determination unit 502 which analyzes the received print job and determines whether a limiting ticket, an example of limiting information, is attached to the print job, a packet conversion unit 504 which, if a limiting ticket is attached, causes the attribute information of the print job to be limited (degenerated) on the basis of limiting information described in the limiting ticket and notifies a subsequent unit of the resulting information, a print job cancellation unit 505 which cancels a print job to which no limiting ticket is attached, a GUI (Graphical User Interface) unit 506 for setting cancellation operation of the print job cancellation unit 505 with an operation panel (not shown), a print data storage unit 507 which temporarily stores print data included in a print job, i.e., PDL (Page Description Language) data, a job management unit 508 which temporarily stores attribute information such as the number of sheets to be printed for a print job and designation of a color mode (monochrome/full-color), a print data interpretation unit 509 which acquires the PDL data from the print data storage unit 507 in accordance with the attribute information stored in the job management unit 508 and performs image forming processing to generate image data, an image storage unit 510 which temporarily stores the image data generated by the print data interpretation unit 509 until printing is completed, and a printer engine 511 which actually prints the image data stored in the image storage unit 510 on a medium such as printing sheet using a known printing technology such as electrophotography or ink-jet technology.

Although each of the print data storage unit 507 and image storage unit 510 may be composed of a secondary storage device such as a high-capacity hard disk, this embodiment is not limited to any particular physical configuration.

The format of a print job will be explained.

A print job is composed of one or more job packets which are standardized such that recognition of the start and end of the print job and setting of the attribute of the print job can be easily performed.

Figure 6:
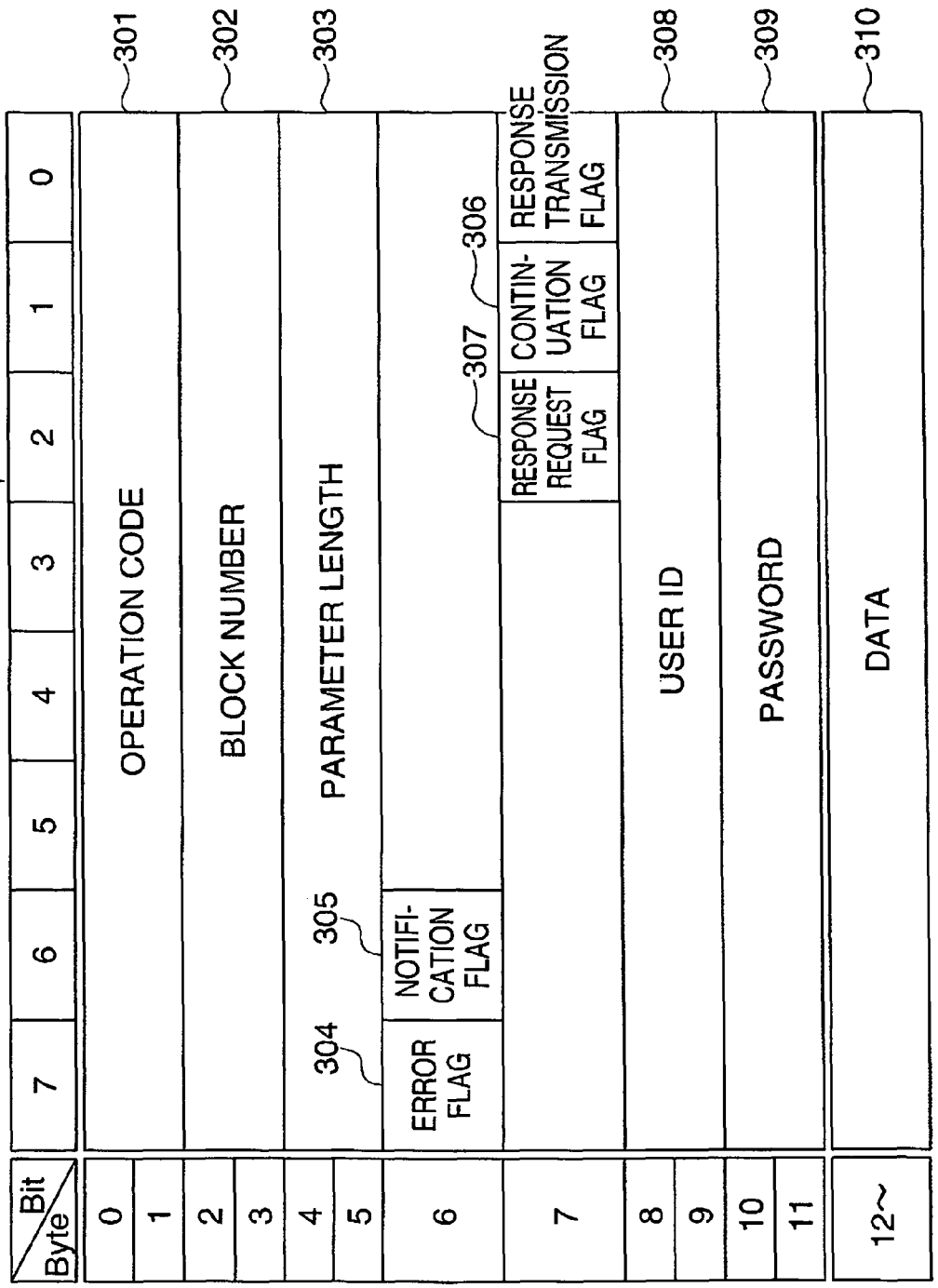
FIG. 6 is a diagram showing an example of the structure of a job packet constituting a print job to which no limiting information is attached.

FIG. 6 is a diagram showing an example of the structure of a job packet constituting a print job to which no limiting information is attached.

In FIG. 6, row headings in the structure of a job packet 300 indicate the ordinal numbers of bytes (Byte) while column headings indicate the ordinal numbers of bits of each byte (Bit).

A two-byte long ID indicating the function of the packet is stored in an operation code area 301 at the zeroth to first bytes. The ID to be stored in the operation code area 301 can have any of the following values:

0x0201: job start operation
0x0202: job attribute setting operation
0x0204: PDL data transmission operation
0x0205: job end operation
0x0301: limiting information operation In a block number area 302 at the second to third bytes, a block number is stored that is used to indicate to which response request of a transmitting side a response from a receiving side corresponds when the transmitting side having transmitted job packets 300 issues response requests to the receiving side. For example, if three job packets whose block numbers are 1, 2, and 3, respectively, are transmitted in succession from the transmitting side to the receiving side, and an error packet with a block number of 2 is returned, the transmitting side can specify that an error has occurred in the job packet transmitted second.

In a parameter length area 303 at the fourth to fifth bytes, the byte length of data is indicated, and a value of 0 to 64 Kbytes can be stored therein.

A flag area at the sixth to seventh bytes stores various types of flags of the job packet 300. In FIG. 6, an error flag 304, notification flag 305, continuation flag 306, response request flag 307, and the like are stored.

Error flag 304: If this flag has a value of 1, it indicates that some error has occurred in the printing apparatus 103. This error flag is attached to a response packet transmitted from the printing apparatus 103 to the host computer 101.

Notification flag 305: If this flag has a value of 1, it indicates that the packet is not a response to a request packet from the host computer 101 and that the printing apparatus 103 has something to notify the host computer 101 of.

Continuation flag 306: If this flag has a value of 1, it indicates that a data area 310 described below cannot accommodate all of data and the remaining data is transmitted in the next job packet. The same operation code as that for the job packet 300 is set for the next job packet.

Response request flag 307: If this flag has a value of 1, it indicates that the host computer 101 requests a response packet from the printing apparatus 103. On the other hand, if the response request flag 307 has a value of 0, no response is made when a transmitted packet is normally processed. If an error has occurred in the printing apparatus 103, a response packet with an error flag of 1 is transmitted from the printing apparatus 103, regardless of whether the value of the response request flag 307 is 0 or 1.

A user ID area 308 at the eighth to ninth bytes and a password area 309 at the tenth to eleventh bytes are used for authentication at the time of security limitations being imposed on an operation that can be carried out with one or more packets transmitted. These areas are not used in this embodiment.

Data corresponding to any of the above described operation codes is stored in a data area 310 at the twelfth to subsequent bytes. If the operation code indicates a job start operation or job end operation, there are no data stored in the data area 310.

If the operation code indicates a job attribute setting operation, a job attribute ID and job attribute value to be set are stored in the data area 310. A job attribute ID is an identifier which is given so as to correspond to an attribute or environment related to each job. IDs corresponding to job attributes defined in the ISO-10175 (ISO: International Organization for Standardization) (DPA) are assigned in advance as job attribute IDs. Typical examples of job attribute IDs are follows:

0x0101: job name
0x0103: job owner name
0x016a: job size
0x0174: the number of sheets to be printed In addition, it is possible to add job attributes such as the number of copies and a color mode (monochrome/full-color) and assign corresponding IDs to the job attributes, depending on the functions of the printing apparatus 103.

Figure 7:
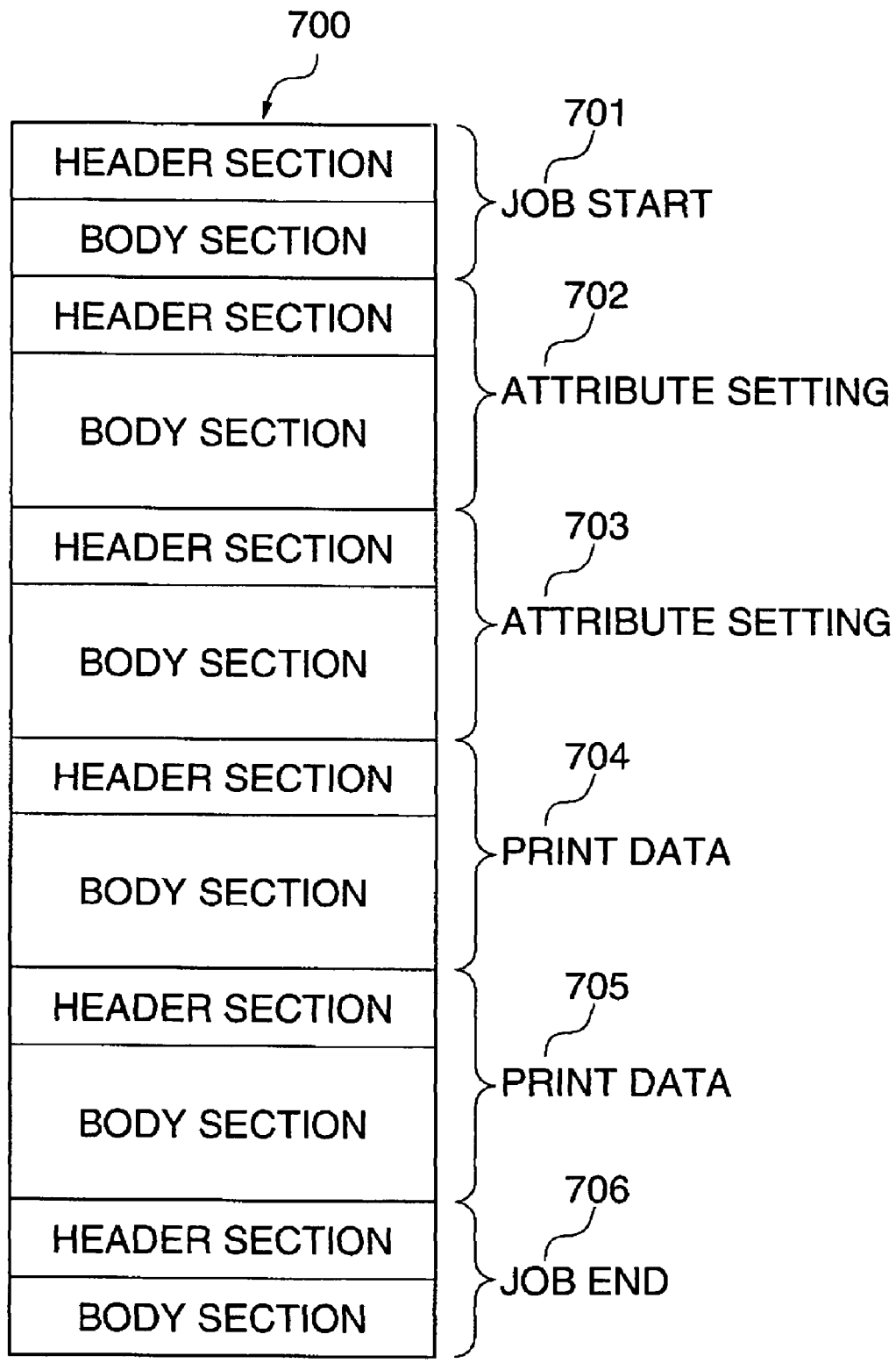
FIG. 7 is a schematic diagram showing the schematic structure of a print job to which no limiting information is attached.

FIG. 7 is a schematic diagram showing the schematic structure of a print job to which no limiting information is attached.

As shown in FIG. 7, a print job 700 is composed of a plurality of job packets, i.e., a job start packet 701, attribute setting packets 702 and 703, print data packets 704 and 705, and a job end packet 706. The job packets are transmitted from the host computer 101 to the printing apparatus 103 in order from the top job packet down to the bottom packet. A job packet is composed of a header section and body section. The header section is a header area at the zeroth to eleventh bytes in FIG. 6, and the body section is a data area at the twelfth to subsequent bytes.

The job start packet 701 is a job packet for declaring the start of the job. The packet can be recognized from a value of 0x0201 indicating a job start operation and stored in the operation code area 301 at the zeroth to first bytes.

The attribute setting packets 702 and 703 are job packets for setting attributes of the print job such as a job name, owner name, and printing conditions. Each of the packets can be recognized from a value of 0x0202 indicating a job attribute setting operation and stored in the operation code area 301 at the zeroth to first bytes. As shown in FIG. 7, attachment of a plurality of job packets for setting the attributes will suffice to set a plurality of attributes.

The print data packets 704 and 705 are job packets for transmitting print data. The packet can be recognized from a value of 0x0204 indicating a PDL data transmission operation and stored in the operation code area 301 at the zeroth to first bytes. Similarly, attachment of a plurality of job packets for transmitting PDL data will suffice to transmit a plurality of PDL data.

The job end packet 706 is a job packet for declaring the end of the job. The packet can be recognized from a value of 0x0205 indicating a job end operation and stored in the operation code area 301 at the zeroth to first bytes.

Verification based on a digital signature performed to verify that limiting information is issued from an authoritative authentication server will be explained.

Figure 8:
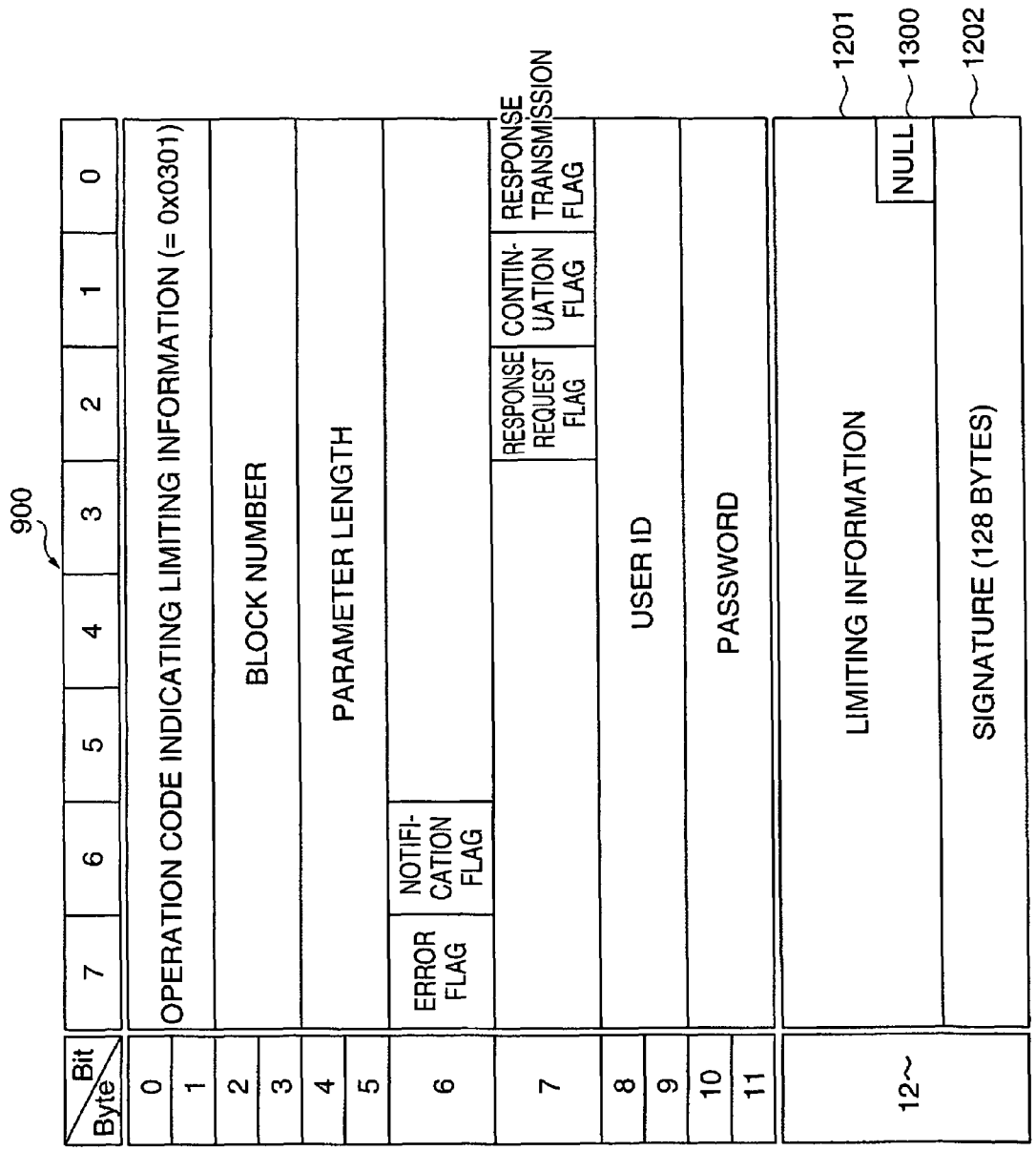
FIG. 8 is a diagram showing an example of the structure of a job packet constituting a print job to which limiting information is attached.

FIG. 8 is a diagram showing an example of the structure of a job packet constituting a print job to which limiting information is attached.

Referring to FIG. 8, in a job packet 900 with limiting information, the zeroth to eleventh bytes constitute a header section, and the twelfth to subsequent bytes constitute a body section (data area). For example, limiting information described in a format 601 shown in FIG. 10 (to be described later) is stored in an area 1201 extending from the top of the data area to a null character 1300 thereof.

In the data area, information of a digital signature (of 128 bytes) is stored in an area 1202 subsequent to the null character 1300. The digital signature is intended to guarantee that limiting information is issued from an authoritative authentication server (e.g., the authentication server 102) and that it is not rewritten by fraudulent means on the way.

For example, one using RSA public-key cryptography is popular as the digital signature. If a digital signature generated by public-key cryptography is used, a digest using a one-way function is generated from an object to be signed (in this case, limiting information). Encryption is performed for the digest with a private key held by an issuer (in this case, the authentication server 102), and a printing apparatus (e.g., the printing apparatus 103) performs verification based on the digital signature using a public key. Only an authoritative authentication server holds the private key. If signature verification using a valid public key is successful, authenticity of the object to be signed can be certified.

The public key used for the digital signature verification is a pair to the public key held by the authentication server 102 and is passed in advance from the authentication server 102 to the printing apparatus 103 prior to printing. As a method of passing a public key using the network 104, there can be considered third-party certification using public key infrastructure (PKI), physical distribution on a memory card, or the like. Any known method may be used, and a detailed explanation thereof will be omitted.

Figure 9:
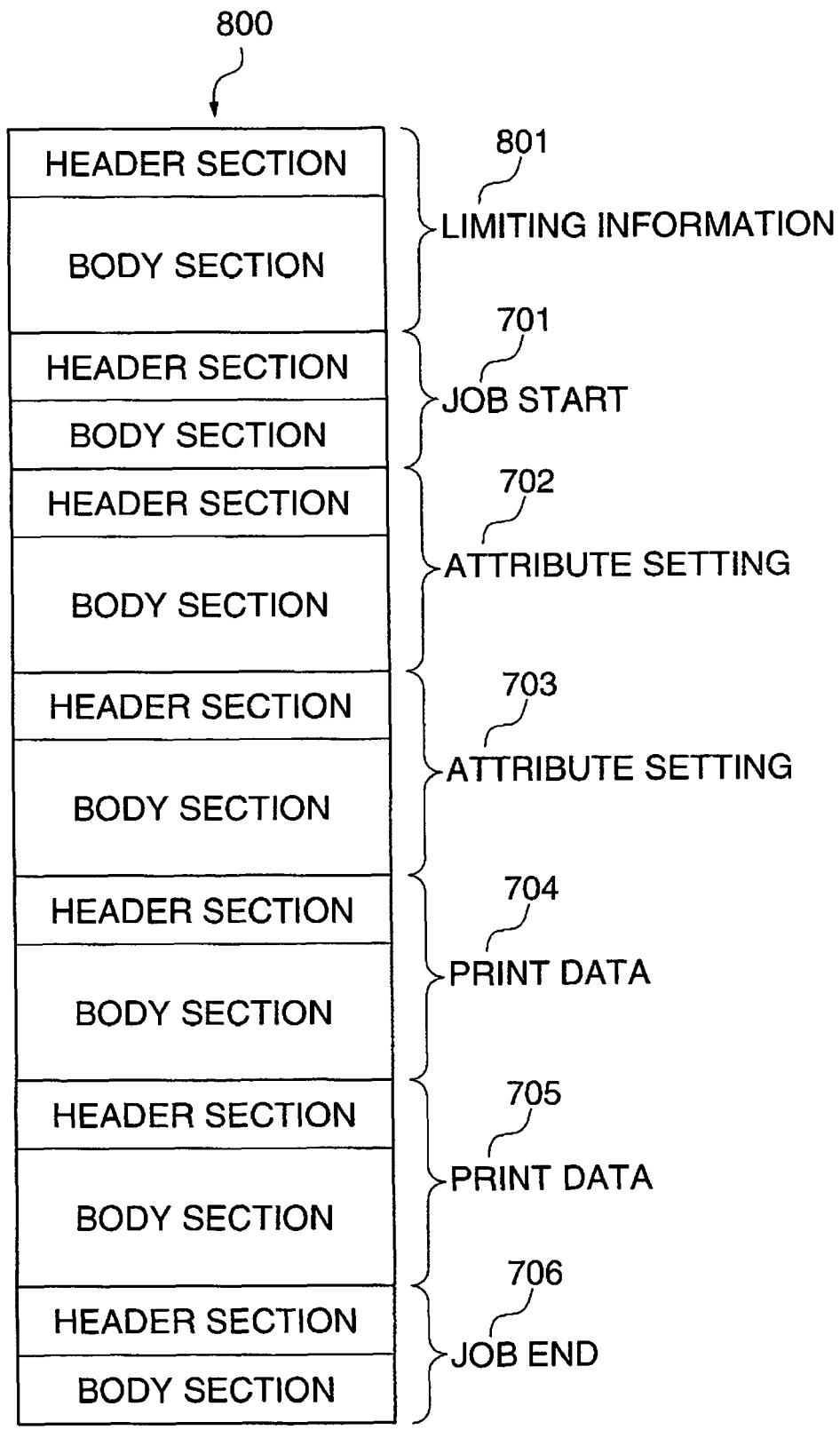
FIG. 9 is a schematic diagram showing the schematic structure of a print job to which the limiting information in FIG. 8 is attached.

FIG. 9 is a schematic diagram showing the schematic structure of a print job to which the limiting information in FIG. 8 is attached.

As shown in FIG. 9, limiting information 801 is attached at the top of a print job 800 as a job packet indicating limiting information, unlike the print job 700 in FIG. 7. The limiting information 801 can be recognized from a code of "0x0301" indicating a limiting information operation and stored in the operation code area 301 at the zeroth to first bytes. Limiting information is stored in the data area of a job packet in which a limiting information operation is designated.

Figure 10:
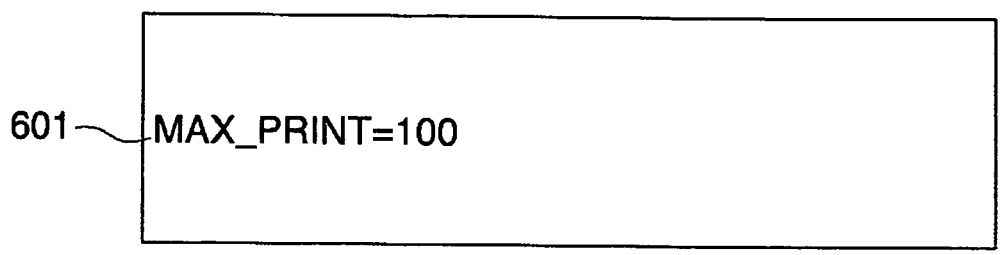
FIG. 10 is a view showing an example of the format of limiting information in FIG. 9.

FIG. 10 is a view showing an example of the format of the limiting information 801 in FIG. 9.

As shown in FIG. 10, the format 601 indicates that the upper limit of the number of sheets that can be printed out in the print job 800 is 100. A character string "MAX_PRINT" means the upper limit of the number of sheets that can be printed out in the print job, and a character string "=100" indicates a value of the upper limit. In FIG. 10, one piece of limiting information is set in one line. However, it is also possible to set a plurality of pieces of limiting information in a plurality of lines.

Whether to enable printing of the print job 700 shown in FIG. 7, to which no limiting information is attached, is generally determined on the basis of the policy defined by a company office. If strict printing limitations are applied to an office as a policy, since it is virtually impossible to impose limitations on a print job to which no limiting information is attached, printing of the print job should not be enabled. If it suffices that printing limitations are imposed for a particular user while providing compatibility with conventional printing functions, output of the print job may be enabled. Only the administrator of the printing system can set such a policy with the GUI unit 506.

Figure 11:
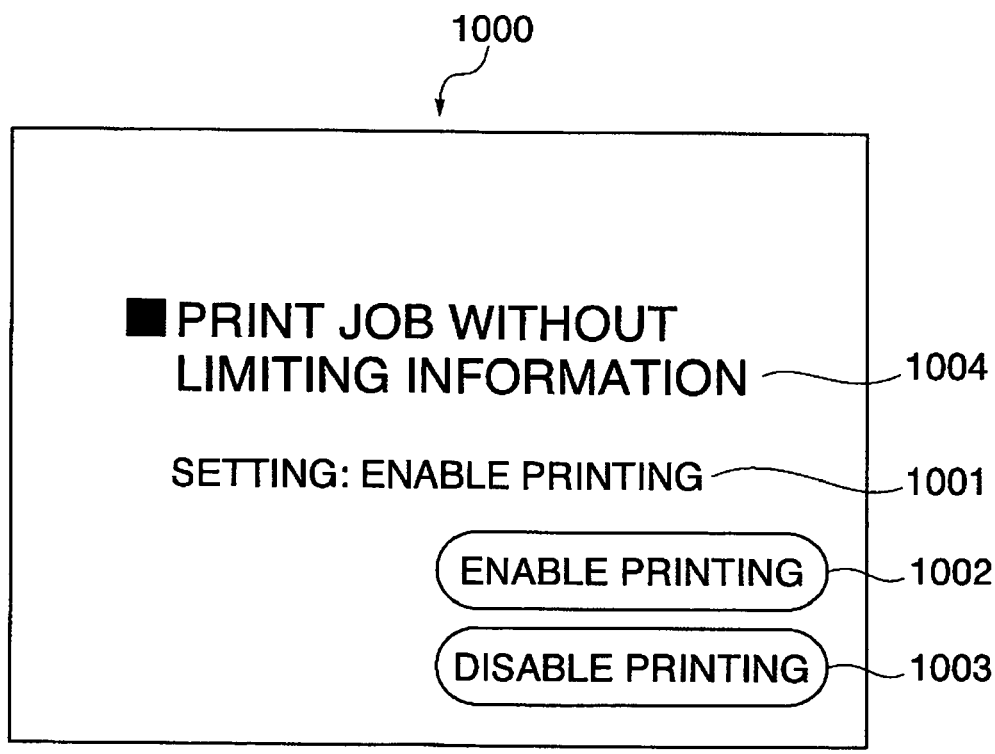
FIG. 11 is a view showing an example of a screen displayed on a GUI unit for setting a policy.

FIG. 11 is a view showing an example of a screen displayed on the GUI unit 506 for setting a policy.

As shown in FIG. 11, a GUI screen 1000 is displayed on the GUI unit 506 or the like when a user who has administrative privileges has succeeded in authentication using a known authentication mechanism such as a password or IC card.

In the GUI screen 1000, a character string 1004 displayed shows that the screen is one for setting the policy on handling of a "print job without limiting information." A setting field 1001 includes a status indication character string which indicates that the current setting is set to "enable printing." A button 1002 is used to change the current setting to "enable printing" while a button 1003 is used to change the current setting to "disable printing." The setting is stored in a non-volatile memory (not shown) in the printing apparatus 103 and continuously held as the policy of the printing apparatus 103.

The process of receiving a print job in the printing apparatus 103 will be explained.

Figure 12:
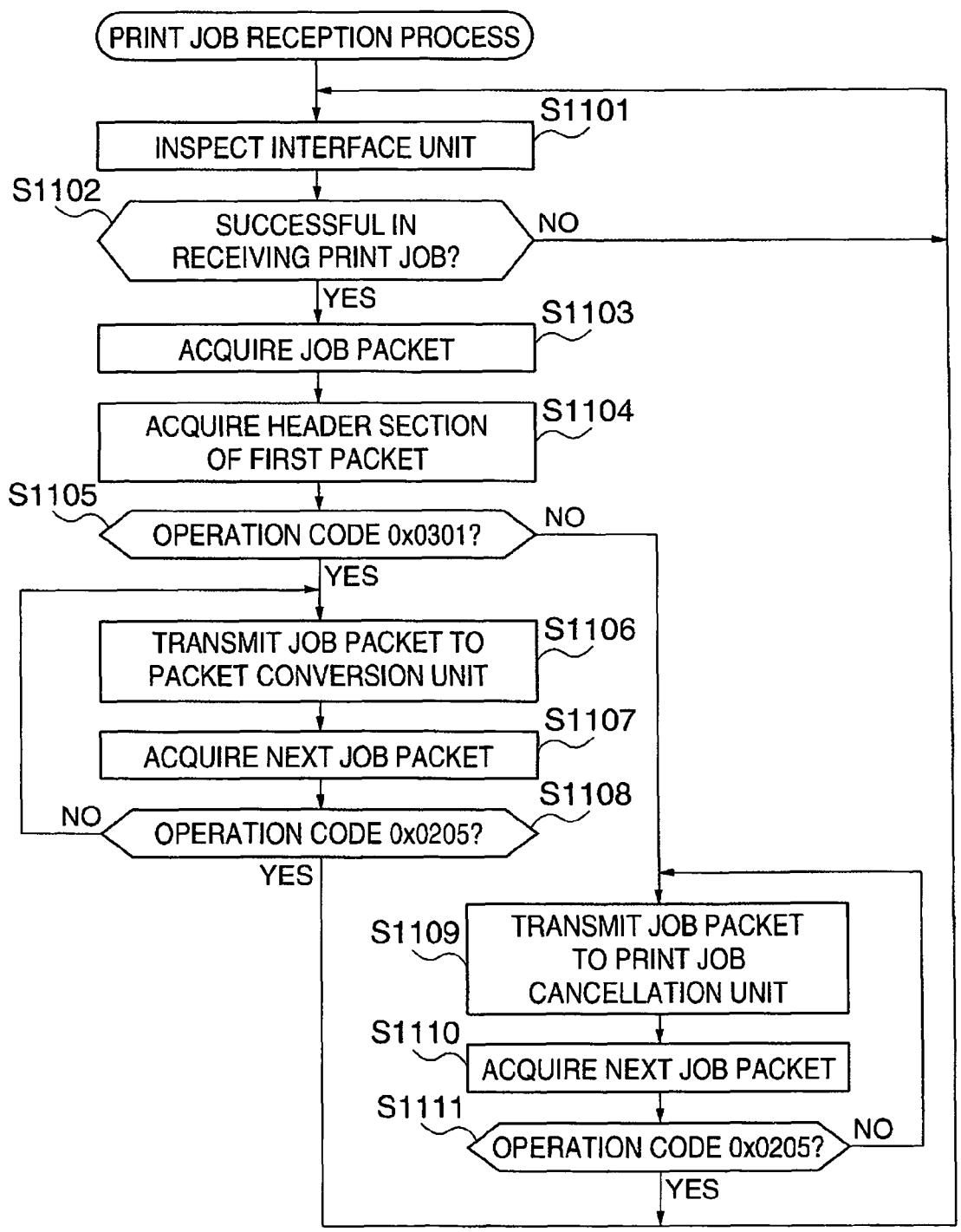
FIG. 12 is a flowchart showing the process of receiving a print job in the printing apparatus.

FIG. 12 is a flowchart showing the process of receiving a print job in the printing apparatus 103. The process is performed by the limiting ticket determination unit 502 in the printing apparatus 103. The limiting ticket determination unit 502 starts operation upon activation of the printing apparatus 103 and continues operation until power-down of the printing apparatus 103.

As shown in FIG. 12, first, the printing apparatus 103 inspects the interface unit 501 (step S1101) and determines whether it has succeeded in receiving a print job (step S1102). If the interface unit 501 has failed to receive a print job, the flow returns to step S1101. On the other hand, if the interface unit 501 has succeeded in receiving a print job, the printing apparatus 103 acquires one job packet from the received print job (step S1103) and further acquires the header section of the job packet (step S1104). The printing apparatus 103 determines whether the operation code in the header section is "0x0301," i.e., a limiting information operation code indicating that limiting information is attached (step S1105).

If the result of the determination in step S1105 shows that the operation code in the header section is a limiting information operation code ("0x0301"), the printing apparatus 103 transmits the job packet to the packet conversion unit 504 (step S1106). The printing apparatus 103 acquires the next job packet (step S1107) and determines whether the operation code is "0x0205," i.e., a job end operation code indicating the end of the job (step S1108). If the result of the determination shows that the operation code is a job end operation code, the flow returns to step S1101; otherwise, the flow returns to step S1106 to repeat the subsequent processing.

On the other hand, the result of the determination in step S1105 shows that the operation code is not a limiting information operation code ("0x0301"), the printing apparatus 103 recognizes the packet as one for a job start operation and transmits the job packet to the print job cancellation unit 505 (step S1109). After that, the printing apparatus 103 acquires the next job packet from the received print job (step S1110) and determines whether the operation code is "0x0205,"i.e., a job end operation code (step S1111 ). If the result of the determination shows that the operation code is a job end operation code, the flow returns to step S1101; otherwise, the flow returns to step S1109 to repeat the subsequent processing.

Operation processes of the packet conversion unit 504 in the process of FIG. 12 will be explained with reference to FIGS. 13 and 14.

Figure 13:
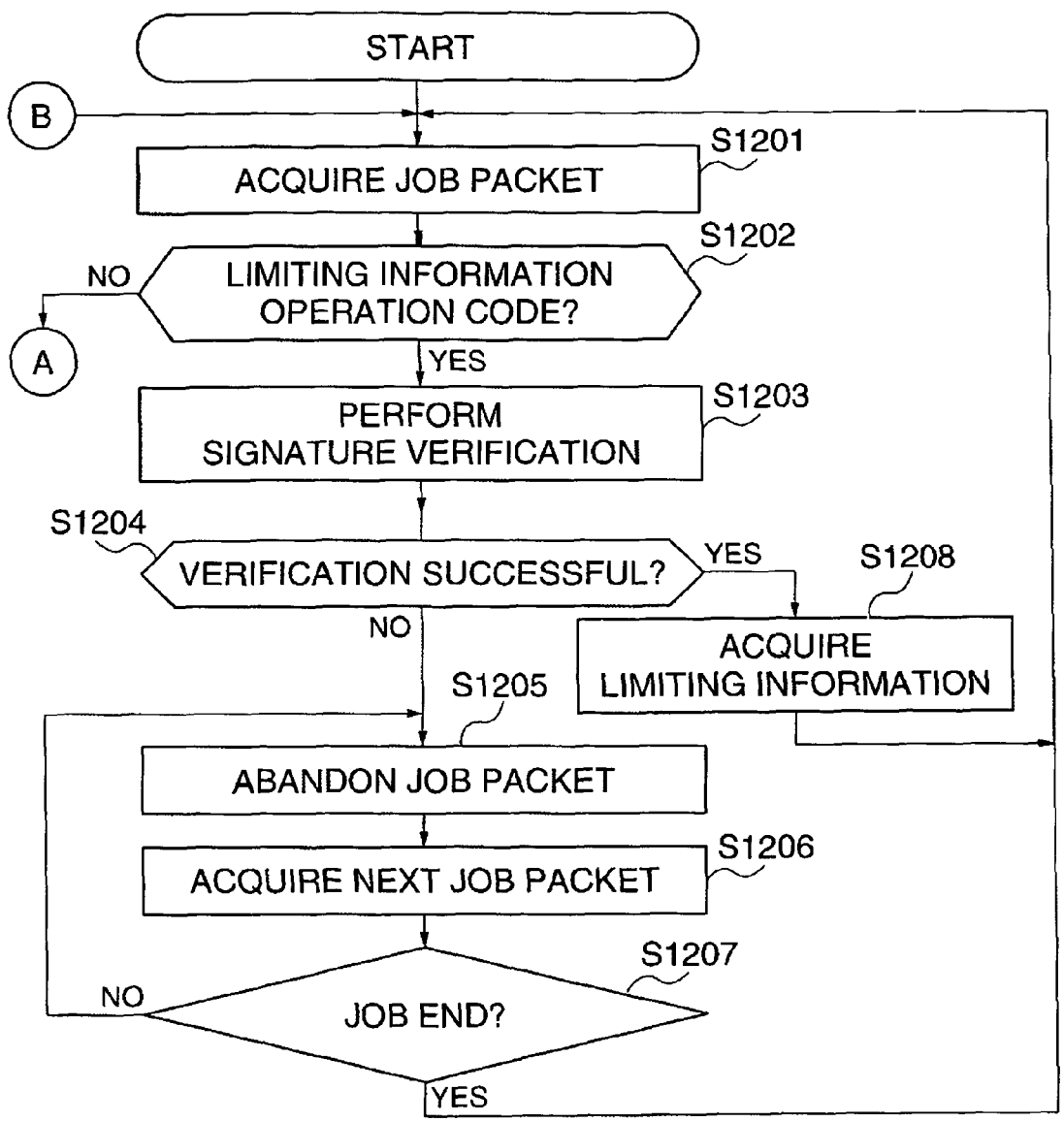
FIG. 13 is a flowchart showing part of an operation process of a packet conversion unit.
Figure 14:
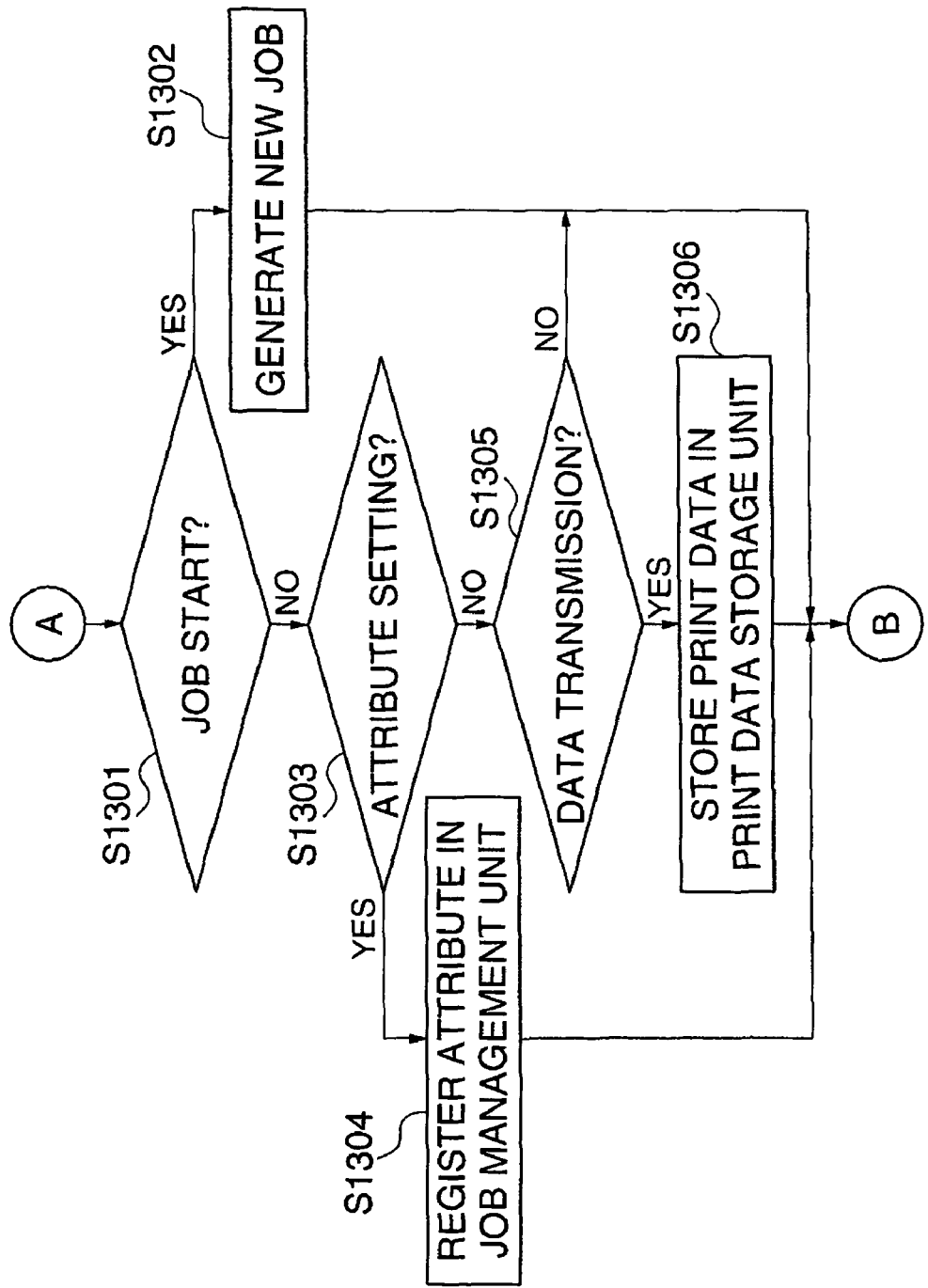
FIG. 14 is a flowchart showing another part of the operation process of the packet conversion unit.

FIGS. 13 and 14 are flowcharts showing the operation processes of the packet conversion unit 504. The packet conversion unit 504 starts operation upon activation of the printing apparatus 103 and continues operation until power-down of the printing apparatus 103.

Referring to FIG. 13, in step S1201, the packet conversion unit 504 acquires one job packet. In step S1202, the packet conversion unit 504 inspects the operation code area 301 in the acquired job packet and determines whether the operation code is a limiting information operation code ("0x0301"). If the result of the determination shows that the operation code is a limiting information operation code, the packet conversion unit 504 performs verification of the signature 1202 using a public key acquired in advance (step S1203).

If the result of the verification shows in step S1204 that the verification is successful, the packet conversion unit 504 acquires limiting information described in, e.g., the format 601 from the area 1201 (FIG. 8) in the job packet and stores the acquired limiting information in the print data storage unit (step S1208), and the flow returns to step S1201. On the other hand, if the verification is unsuccessful in step S1204, the packet conversion unit 504 abandons the job packet (step S1205) and acquires the next job packet (step S1206).

The packet conversion unit 504 determines in step S1207 whether the end of the job has been reached or not. If NO in step S1207, the flow returns to step S1205. On the other hand, if YES in step S1207, the flow returns to step S1201 to continue the process. As a result, if the verification is unsuccessful, all the job packets are abandoned in sequence before or at the end of the print job.

On the other hand, if the result of the determination in step S1202 shows that the operation code is not a limiting information operation code, the flow advances to step S1301 in FIG. 14 to perform normal job packet interpretation processing.

Referring to FIG. 14, in step S1301, whether the start of the job or not is determined on the basis of determination whether the operation code is a job start operation code ("0x0201"). If the result of the determination shows the start of the job, the packet conversion unit 504 generates a new job, i.e., reserves an area for the print job in the job management unit 508 and assigns a job identifier to the job (step S1302). The flow returns to step S1201 in FIG. 13.

If the result of the determination in step S1301 does not show the start of the job, the packet conversion unit 504 determines whether the job packet is intended for attribute setting, i.e., whether the operation code is a job attribute setting operation code ("0x0202") (step S1303). If the result of the determination shows that the operation code is a job attribute setting operation code ("0x0202"), an attribute setting in the job packet is registered in an attribute area for the print job of the job management unit 508 (step S1304), and the flow returns to step S1201. On the other hand, if the operation code is not a job attribute setting operation code ("0x0202"), the packet conversion unit 504 determines whether the job packet is intended for data transmission, i.e., whether the operation code is a PDL data transmission operation code ("0x0204") (step S1305). If the result of the determination shows the operation code is a PDL data transmission operation code ("0x0204"), the packet conversion unit 504 stores the attribute information of the print job in the print data storage unit 507 together with print data (step S1306), and the flow returns to step S1201. On the other hand, if the operation code is not a PDL data transmission operation code ("0x0204"), the flow returns to step S1201.

An operation process of the print data interpretation unit 509 based on limiting information will be explained with reference to FIG. 15.

The print data interpretation unit 509 interprets so-called PDL data and generates image data used for actual printing. Various types of standards such as PostScript and LIPS are implemented as PDLs.

Figure 15:
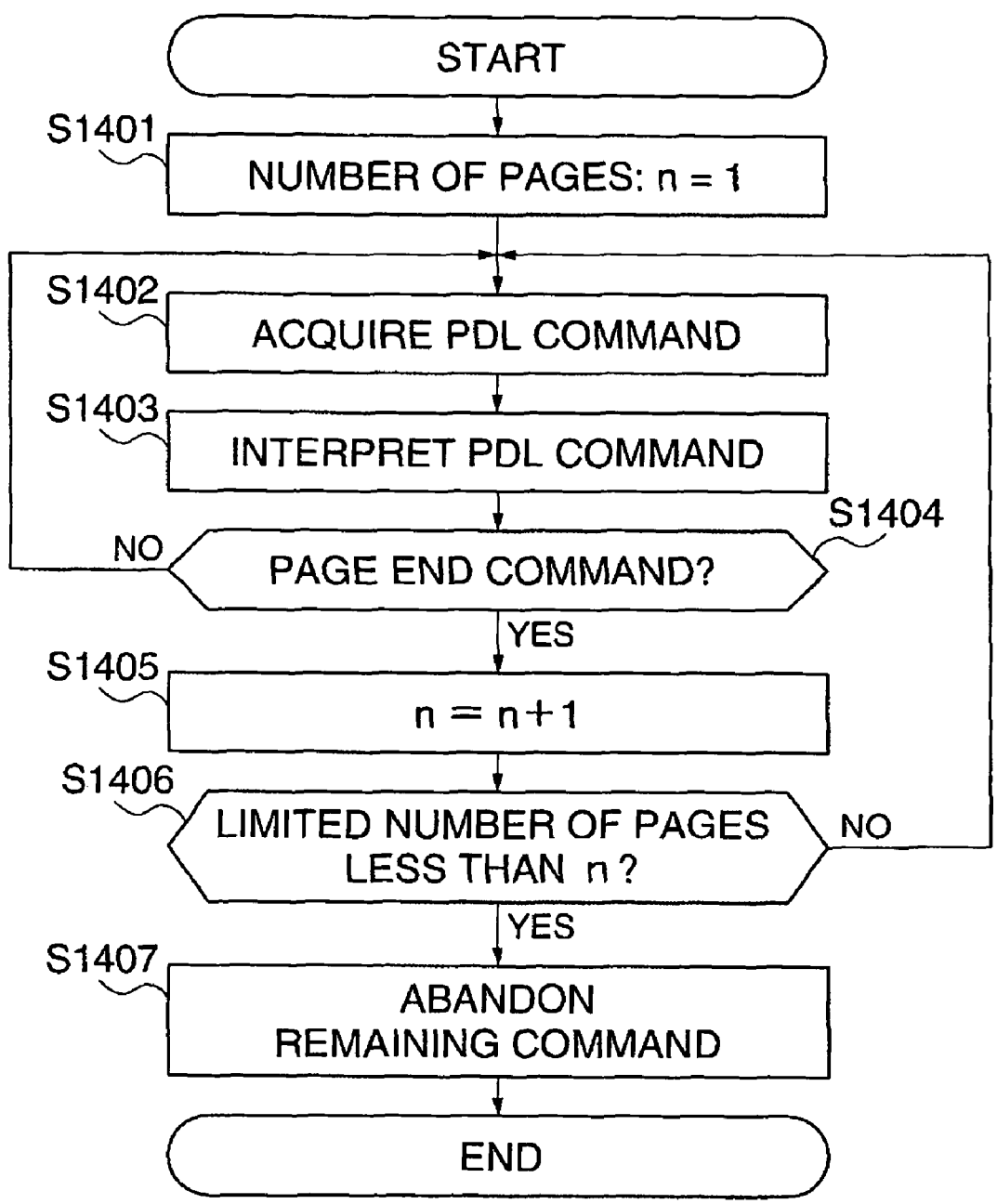
FIG. 15 is a flowchart showing an operation process of a print data interpretation unit.

FIG. 15 is a flowchart showing the operation process of the print data interpretation unit 509. The print data interpretation unit 509 continues processing until interpretation of the last page of a print job received by the printing apparatus 103 is completed.

Referring to FIG. 15, first, the print data interpretation unit 509 initializes a variable n indicating the number of printed pages to 1 (step S1401). The print data interpretation unit 509 then acquires a PDL command as print data from the print data storage unit 507 (step S1402) and performs interpretation processing for the PDL command (step S1403). If limiting information is attached to the print job, limiting information stored in the print data storage unit 507 in step S1208 of FIG. 13 is acquired as the PDL command and is subjected to the interpretation processing. On the other hand, if no limiting information is attached to the print job and if setting is made to enable printing of the print job, the attribute information of the print job stored in the print data storage unit 507 in step S1306 of FIG. 14 is acquired as the PDL command and is subjected to the interpretation processing. With this operation, the attribute information of the print job created by the printer driver in the host computer 101 is overwritten with limiting information-based attribute information. Note that, for example, a command for actually performing drawing such as "draw rectangle" or "draw image" in LIPS is assumed as a PDL command.

In step S1404, the print data interpretation unit 509 determines whether the PDL command processed in step S1403 is a page end command. If the PDL command is not a page end command, the flow returns to step S1402. On the other hand, if the PDL command is a page end command, the print data interpretation unit 509 increments the variable n by 1 (step S1405) and determines whether the variable n exceeds the limited number of pages in the limiting information acquired in step S1208 in FIG. 13 (the upper limit of the number of sheets to be printed in the limiting information described in the format 601) (step S1406).

If the result of the determination in step S1406 shows that the variable n does not exceed the limited number of pages, the flow returns to step S1402. On the other hand, if the variable n exceeds the number, the print data interpretation unit 509 abandons all remaining commands (step S1407) and ends the process. In the format 601 shown in FIG. 10, the upper limit of the number of sheets that can be printed out is 100. Accordingly, after a page end command of print data is detected 100 times, remaining data is skipped and is not printed.

An operation process of the print job cancellation unit 505 in the process of FIG. 12 will be explained with reference to FIG. 16.

Figure 16:
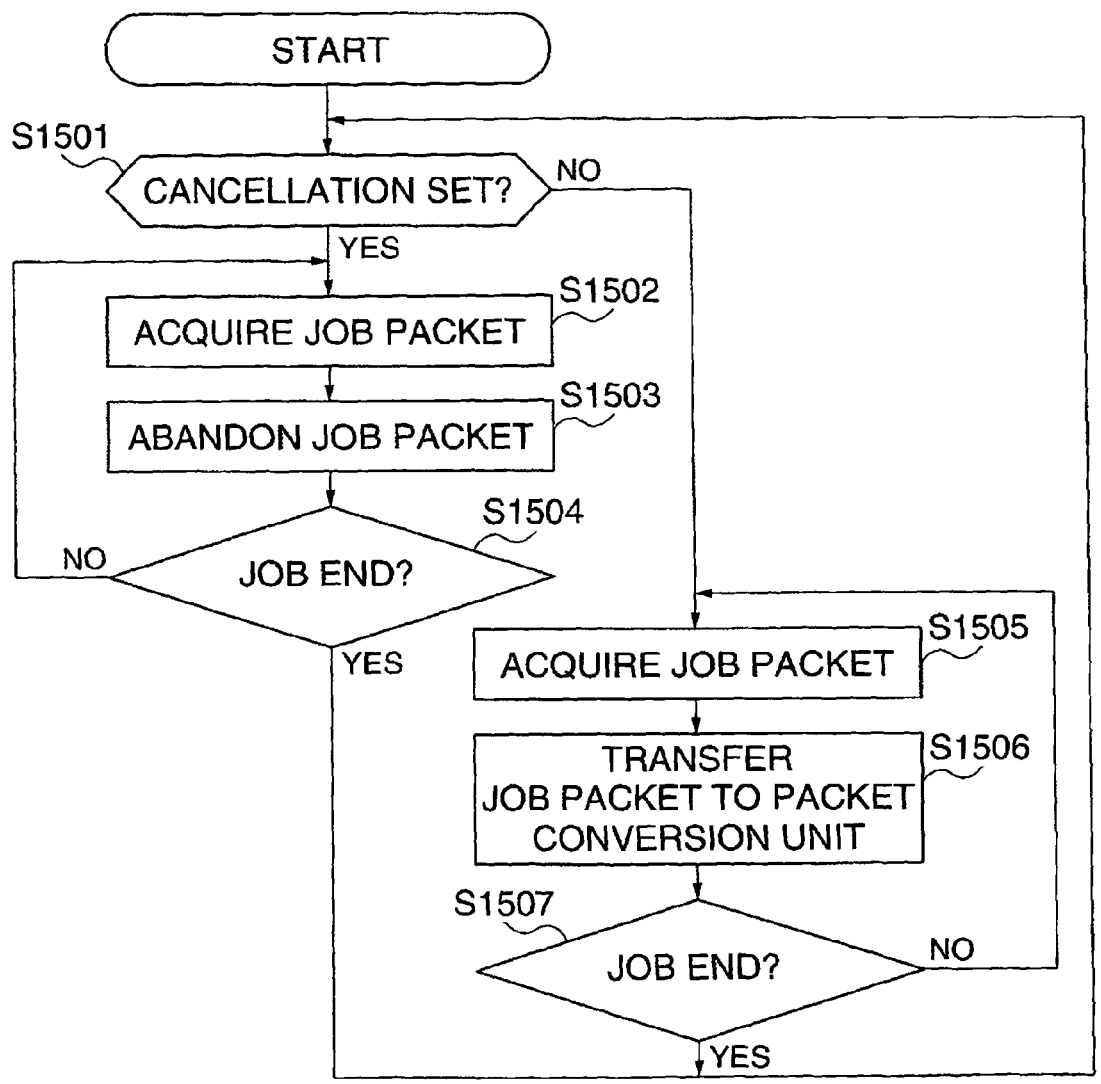
FIG. 16 is a flowchart showing an operation process of a print job cancellation unit.

FIG. 16 is a flowchart showing the operation process of the print job cancellation unit 505. The print job cancellation unit 505 starts operation upon activation of the printing apparatus 103 and continues operation until power-down of the printing apparatus 103.

If the limiting ticket determination unit 502 20 determines that no limiting information is attached to a print job (NO in step S1105 in FIG. 12), the print job is transferred to the print job cancellation unit 505.

Referring to FIG. 16, in step S1501, the print job cancellation unit 505 determines whether cancellation is set, i.e., the current setting is set to "disable printing" by a press of the button 1003 in the GUI screen 1000 of FIG. 11. If the result of the determination shows that cancellation is set, i.e., the current setting is set to "disable printing," the print job cancellation unit 505 performs cancellation operation of the print job. The print job cancellation unit 505 acquires a job packet (step S1502) and abandons the acquired job packet (step S1503).

The print job cancellation unit 505 determines in step S1504 whether the end of the job has been reached or not. If NO in step S1504, the flow returns to step S1502; otherwise, the flow returns to step S1501.

On the other hand, if the result of the determination in step S1501 shows that cancellation is not set, i.e., the current setting is set to "enable printing" by a press of the button 1002 in the GUI screen 1000 of FIG. 11, the print job cancellation unit 505 acquires a job packet (step S1505) and transfers the acquired job packet to the packet conversion unit 504 (step S1506).

The print job cancellation unit 505 then determines in step S1507 whether the end of the job has been reached or not. If NO in step S1507, the flow returns to step S1505; otherwise, the flow returns to step S1501.

According to the first embodiment, the limiting ticket determination unit 501 analyzes a received print job and determines whether the operation code of the print job is a limiting information operation code indicating attachment of limiting information. If the operation code is not a limiting information operation code, the print job cancellation unit 505 abandons the print job on the basis of a setting set on the GUI screen 1000. On the other hand, if the operation code is a limiting information operation code, the packet conversion unit 504 performs digital signature verification by public-key cryptography. If the verification result is successful, the packet conversion unit 504 acquires limiting information described in, e.g., the format 601, and the print data interpretation unit 509 imposes limitations on printing-out of print data on the basis of the limiting information. Accordingly, it is possible to impose, with limiting information issued by the authentication server 102, limitations on printing-out of a print job without changing the configuration of the printer driver from a conventional one to another and to suppress disordered printing-out by a user and contribute to a reduction in TCO.

It is also possible to suppress output of a print job without limiting information, thus suppressing printing against a limiting policy. It is further possible to forcibly designate double-sided printing, N-in-1 printing, and/or monochrome printing for a print job with limiting information issued by the authentication server 102, whereby disordered printing can be suppressed, thus contributing to a reduction in TCO.

Next, a printing system according to a second embodiment of the present invention will be explained.

The second embodiment has the same configuration as that of the first embodiment, and an explanation thereof will be omitted. Only differences from the first embodiment will be explained below.

In the first embodiment, a reduction in TCO can be implemented by describing, as limiting information, the contents limiting the number of sheets to be printed (e.g., the upper limit of the number of sheets to be printed). In the second embodiment, similar effects can be obtained by describing, as limiting information, the contents designating double-sided printing (printing on the opposite sides, the front and back sides of one sheet), N-in-1 (or N-up) printing in which a plurality of pages are reduced and laid out on one printing sheet, monochrome printing, and the like instead.

Figure 17:
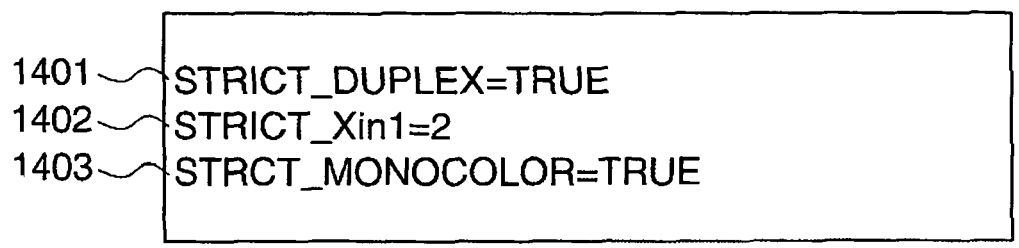
FIG. 17 is a view showing an example of the format of limiting information according to a second embodiment of the present invention.

FIG. 17 is a view showing an example of the format of limiting information according to the second embodiment of the present invention. A license ticket carries a signature as shown in FIG. 17 to prevent falsification.

In FIG. 17, a format 1401 is a limiting format for forcing double-sided printing. A format 1402 is a limiting format for forcing, e.g., 2-in-1 printing as N-in-1 printing. A format 1403 is a limiting format for forcing monochrome printing. Limiting information described in these limiting formats is acquired from a job packet and stored (step S1208 in FIG. 13). This affects the operation of a print data interpretation unit 508 and invalidates all of command designations based on PDL data against the limiting information. Accordingly, it becomes possible to reduce the number of sheets used for printing-out and the running costs including the cost of expendable supplies such as toner ink.

According to the second embodiment, double-sided printing, N-in-1 printing, and monochrome printing are described as pieces of limiting information, in addition to those described in the first embodiment. This makes it possible to not only obtain the effects of the first embodiment but also more effectively reduce the TCO.

It is to be understood that the object of the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD+/−RW, a DVD+/−R, a magnetic tape, a nonvolatile memory card, and a ROM. Alternatively, the program code may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

In this case, the program code may be supplied directly from a storage medium on which the program code is stored, or from a computer, database, or the like, not shown, that is connected via the Internet, a commercial network, a local area network, or the like.

Although in the above described embodiments, the case where electrophotographic printing is adopted has been explained, there is no intention to limit the invention to this. For example, the present invention may be applied to a variety of printing methods such as ink-jet printing, thermal transfer, thermal printing, electrostatic printing, and discharge breakdown printing.

The form of the program may be an object code, a program code executed by an interpreter, or script data supplied to an OS (Operating System).

This application claims the benefit of Japanese Patent Applications Nos. 2005-047507 filed Feb. 23, 2005 and Japanese Patent Application No. 2006-038462 filed Feb. 15, 2006, which are hereby incorporated by reference herein in their entirety.

What is claimed is:

1. An image forming apparatus which prints out a print job received through a network, wherein the print job includes print data and attribute information indicating print settings of the print data, the apparatus comprising:

an acquisition device that acquires limiting information as packets through the network with the reception of the print job, wherein the limiting information is used to limit the print settings indicated by the attribute information in the print job when the image forming apparatus prints out the print job, and is managed in a print system to which the image forming apparatus belongs;

a verification device that verifies digital signature information included in packets containing the limiting information acquired by said acquisition device, wherein the digital signature information is for guaranteeing that an issuer of the limiting information is authorized and the limiting information is not rewritten by fraudulent means when in transit;

a control device that controls to print out, if the attribute information in the print job indicates the print settings not to be limited by the limiting information, the print job in accordance with the attribute information in the print job, and print out, if the attribute information in the print job indicates the print settings to be limited by the limiting information, the print job with print settings different from the print settings indicated by the attribute information in the print job in accordance with the limiting information acquired by said acquisition device; and a setting device that sets a policy to disable printing of a print job without the limiting information, wherein each of the packets containing the limiting information include a header including codes indicating the limiting information, wherein the limiting information designates at least double-sided printing setting, monochrome printing setting, N-up printing setting (N≧2), or combinations thereof, for limiting the print settings indicated by the attribute information, and wherein, when the verification of the digital signature information included in a particular packet of the packets by said verification device is successful, said control device controls to store the limiting information in a storage unit so that said control device prints out in accordance with the limiting information, and when the verification of the digital signature information included in the particular packet by said verification device is unsuccessful, said control device controls to abandon the packets.

2. The image forming apparatus according to claim 1, further comprising:

a determination device that determines whether or not said acquisition device acquires the limiting information with the reception of the print job; and a print job cancellation device that cancels the print job if said determination device determines that the limiting information is not acquired.

3. The image forming apparatus according to claim 1, wherein said control device controls to limit a number of sheets to be printed out for the print job to be not more than an upper limit of the number of sheets to be printed out if the upper limit is included in the limiting information.

4. The image forming apparatus according to claim 1, wherein the limiting information for a guest user is managed in said print system.

5. A control method implemented by one or more data processing devices for an image forming apparatus which prints out a print job received through a network, wherein the print job includes print data and attribute information indicating print settings of the print data, the method comprising:

an acquisition step of acquiring limiting information as packets through the network with the reception of the print job, wherein the limiting information is used to limit the print settings indicated by the attribute information in the print job when the image forming apparatus prints out the print job, and is managed in a print system to which the image forming apparatus belongs;

a verification step of verifying digital signature information included in packets containing the limiting information acquired in said acquisition step, wherein the digital signature information is for guaranteeing that an issuer of the limiting information is authorized and the limiting information is not rewritten by fraudulent means when in transit;

a control step of controlling the image forming apparatus to print out, if the attribute information in the print job indicates the print settings not to be limited by the limiting information, the print job in accordance with the attribute information in the print job, and print out, if the attribute information in the print job indicates the print settings to be limited by the limiting information, the print job with print settings different from the print settings indicated by the attribute information in the print job in accordance with the limiting information acquired in the acquisition step; and a setting step of setting a policy to disable printing of a print job without the limiting information, wherein each of the packets containing the limiting information include a header including codes indicating the limiting information, wherein the limiting information designates at least double-sided printing setting, monochrome printing setting, N-up printing setting (N≧2), or combinations thereof, for limiting the print settings indicated by the attribute information, and wherein, when the verification of the digital signature information included in a particular packet of the packets in said verification step is successful, it is controlled in said control step to store the limiting information in a storage unit so that it is controlled in said control step to print out in accordance with the limiting information, and when the verification of the digital signature information included in the particular packet in said verification step is unsuccessful, it is controlled in said control step to abandon the packets.

6. The control method for an image forming apparatus according to claim 5, further comprising:

a determination step of determining whether or not said acquisition step acquires the limiting information with the reception of the print job; and a print job cancellation step of canceling the print job if it is determined in the determination step that the limiting information is not acquired.

7. The control method for an image forming apparatus according to claim 5, wherein said control step controls to limit a number of sheets to be printed out for the print job to be not more than an upper limit of the number of sheets to be printed out if the upper limit is included in the limiting information.

8. A non-transitory computer-readable storage medium storing a program that when executed by a computer causes the computer to perform a control method for an image forming apparatus which prints out a print job received through a network, wherein the print job includes print data and attribute information indicating print settings of the print data, the program comprising:

instructions for an acquisition step of acquiring limiting information as packets through the network with the reception of the print job, wherein the limiting information is used to limit the print settings indicated by the attribute information in the print job when the image forming apparatus prints out the print job, and is managed in a print system to which the image forming apparatus belongs;

instructions for a verification step of verifying digital signature information included in packets containing the limiting information acquired in said acquisition step, wherein the digital signature information is for guaranteeing that an issuer of the limiting information is authorized and the limiting information is not rewritten by fraudulent means when in transit;

instructions for a control step of controlling to print out, if the attribute information in the print job indicates the print settings not to be limited by the limiting information, the print job in accordance with the attribute information in the print job, and print out, if the attribute information in the print job indicates the print settings to be limited by the limiting information, the print job with print settings different from the print settings indicated by the attribute information in the print job in accordance with the limiting information acquired in the acquisition step; and instructions for a setting step of setting a policy to disable printing of a print job without the limiting information, wherein each of the packets containing the limiting information include a header including codes indicating the limiting information, wherein the limiting information designates at least double-sided printing setting, monochrome printing setting, N-up printing setting ($N \geqq 2$), or combinations thereof, for limiting the print settings indicated by the attribute information, and wherein when the verification of the digital signature information included in a particular packet of the packets in said verification step is successful, it is controlled in said control step to store the limiting information in a storage unit so that it is controlled in said control step to print out in accordance with the limiting information, and when the verification in said verification step is unsuccessful, it is controlled in said control step to abandon the packets.

* * * * *